(12) United States Patent
Dupont et al.

(10) Patent No.: US 12,484,982 B2
(45) Date of Patent: Dec. 2, 2025

(54) BIMANUAL NEUROENDOSCOPIC ROBOT

(71) Applicant: The Children's Hospital Medical Center Corporation, Boston, MA (US)

(72) Inventors: Pierre Dupont, Boston, MA (US); Karl Price, Boston, MA (US)

(73) Assignee: The Children's Medical Center Corporation, Boston, MA (US)

( * ) Notice: Subject to any disclaimer, the term of this patent is extended or adjusted under 35 U.S.C. 154(b) by 866 days.

(21) Appl. No.: 17/154,577

(22) Filed: Jan. 21, 2021

(65) Prior Publication Data
US 2021/0228296 A1  Jul. 29, 2021

Related U.S. Application Data

(60) Provisional application No. 62/965,399, filed on Jan. 24, 2020.

(51) Int. Cl.
| | | |
|---|---|---|
| A61B 34/00 | (2016.01) | |
| A61B 17/00 | (2006.01) | |
| A61B 34/30 | (2016.01) | |

(52) U.S. Cl.
CPC .............. *A61B 34/71* (2016.02); *A61B 34/30* (2016.02); *A61B 2034/301* (2016.02)

(58) Field of Classification Search
CPC .... A61B 34/71; A61B 34/30; A61B 2034/301
See application file for complete search history.

(56) References Cited

U.S. PATENT DOCUMENTS

| | | |
|---|---|---|
| 6,132,368 A | 10/2000 | Cooper |
| 6,866,671 B2 | 3/2005 | Tierney et al. |
| 7,883,475 B2 | 2/2011 | Dupont et al. |
| 8,206,406 B2 | 6/2012 | Orban, III |
| 9,060,678 B2 | 6/2015 | Larkin et al. |
| 9,457,168 B2 | 10/2016 | Moll et al. |
| 10,238,457 B2 | 3/2019 | Herrell et al. |

(Continued)

OTHER PUBLICATIONS

Cappabianca et al., "Application of Neuroendoscopy to Intraventricular Lesions," Neurosurgery, Feb. 2008 Supplement, vol. 62, No. 2, pp. SHC575-SHC598.

(Continued)

*Primary Examiner* — Benjamin J Klein
*Assistant Examiner* — Thien Jason Tran
(74) *Attorney, Agent, or Firm* — Greenberg Traurig, LLP; Melissa Hunter-Ensor; Joshua I. Rudawitz

(57) ABSTRACT

A robotic device comprising a support structure, a robotic arm coupled to the support structure and having a working channel extending from a proximal end to a distal end of the robotic arm, a drive system coupled to the support structure, and a tool module configured to detachably couple to the drive system, wherein the tool module comprises an elongate tool configured to be advanced through the working channel to a surgical site at the distal end of the robotic arm and subsequently removed from the robotic arm without having to withdraw the robotic arm from the surgical site, and a transmission configured to operatively connect the drive system and the elongate tool when the tool module is coupled with the drive system thereby providing for operation of the elongate tool by the drive system.

25 Claims, 31 Drawing Sheets

(56) References Cited

U.S. PATENT DOCUMENTS

| | | | |
|---|---|---|---|
| 10,307,214 B2* | 6/2019 | Lathrop | A61B 34/37 |
| 2008/0188890 A1* | 8/2008 | Weitzner | A61B 1/00165 |
| | | | 606/205 |
| 2016/0367120 A1 | 12/2016 | Dupont et al. | |
| 2017/0095299 A1 | 4/2017 | Hendrick et al. | |
| 2021/0236773 A1 | 8/2021 | Dupont et al. | |

OTHER PUBLICATIONS

Da Vinci Surgical System User Manual, 2014, 100 pages.

Dupont et al., "Design and Control of Concentric-Tube Robots," IEEE Transactions on Robotics, Apr. 2010, vol. 26, No. 2, pp. 209-225.

Fagogenis et al., "Autonomous robotic intracardiac catheter navigation using haptic vision," Science Robotics, Apr. 24, 2019, vol. 4, eaaw1977, pp. 1-12.

Fukushima et al., "Endoscopic Biopsy of Intraventricular Tumors with the Use of a Ventriculofiberscope," Neurosurgery, 1978, vol. 2, No. 2, pp. 110-113.

Gaab et al., "Neuroendoscopic approach to intraventricular lesions," Journal of Neurosurgery, Mar. 1998, vol. 88, pp. 496-505.

Hendrick, Richard J., "System Design and Elastic Stability Modeling of Transendoscopic Continuum Robots," Doctoral Dissertation, May 2017, 243 pages.

Lee et al., "Anisotropic Patterning to Reduce Instability of Concentric-Tube Robots," IEEE Transactions on Robotics, Dec. 2015, vol. 31, No. 6, pp. 1311-1323.

Luo et al., "Designing Concentric Tube Manipulators for Stability Using Topology Optimization," 2018 IEEE/RSJ International Conference on Intelligent Robots and Systems (IROS), Madrid, Spain, Oct. 1-5, 2018, pp. 1764-1769.

Souweidane et al., "Endoscopic resection of solid intraventricular brain tumors," Journal of Neurosurgery, Aug. 2006, vol. 105, pp. 271-278.

Souweidane et al., "Endoscopic Surgery for Intraventricular Brain Tumors in Patients Without Hydrocephalus," Operative Neurosurgery, Oct. 2005, vol. 57, No. 4, pp. ONS-312-ONS-318.

Teo et al., "Neuro-oncologic applications of endoscopy," Neurosurgery Clinics of North America, 2004, vol. 15, pp. 89-103.

* cited by examiner

BIMANUAL NEUROENDOSCOPIC ROBOT

CROSS-REFERENCE TO RELATED APPLICATIONS

This application claims the benefit of and priority to U.S. Provisional Application No. 62/965,399, filed Jan. 24, 2020 which is hereby incorporated by reference in its entirety for all purposes.

FEDERALLY SPONSORED RESEARCH OR DEVELOPMENT

This invention was made with government support under Grant No. RO1 NS099207, awarded by the National Institutes of Health (NIH). The government has certain rights in the invention.

FIELD

The present disclosure relates to robotic devices designed to perform medical procedures and, in particular, bimanual neuroendoscopic robots for minimally invasive procedures within the body such as brain and cardiac surgeries.

BACKGROUND

Over 380,000 intracranial neurosurgical procedures are performed annually in the US to treat brain tumors, trauma, epilepsy, hydrocephalus and vascular lesions. While open microsurgery is used for the majority of cases, its invasiveness damages healthy brain tissue resulting in neurological deficits, prolonged hospital stay, and increased costs including rehabilitation. Existing endoscopic technology, however, is only used for about 1% of all lesions since it is effective for resecting small, relatively avascular intraventricular lesions, but not for the far more common larger, vascular lesions extending into the parenchyma surrounding the ventricles.

Most current neuroendoscope systems (Karl Storz, Aesculap, etc.) include a single working channel for passing a tool and so force the surgeon to perform surgical tasks in a one-handed fashion while open surgery allows the use of both hands wielding different tools, such as scissors, graspers, dissectors and bipolar cautery. A few endoscope designs have two working channels which theoretically should enable the bimanual tasks of open surgery. Since the tools are straight and enter the brain through parallel working channels, however, it is not possible to perform true bimanual tasks. Since for both the single tool and two-tool endoscopes, the tools cannot be moved laterally, one must pivot the endoscope about the burr hole in the skull to reach the targeted tissue. This movement of the endoscope is dangerous since it presses against healthy brain tissue along the surgical corridor extending from the entry point on the skull to the endoscope tip.

Currently, no effective endoscopic technique exists for quickly identifying and occluding bleeding sites and the field is rapidly obscured by bloody cerebrospinal fluid (CSF). Control of bleeding requires suction/irrigation and application of cautery. These maneuvers are bimanual tasks, e.g., one hand grasps and lifts tissue while the second reaches over and ablates. As described above, most endoscopes do not support bimanual manipulation since they have only a single instrument channel or, if they possess additional channels, all instruments extend from the scope along straight parallel lines.

Over the past two decades, improvements in neurosurgical outcomes have been driven by technological advances such as the introduction of endoscopy. Endoscopy enables navigation through the clear fluid-filled ventricular system of the brain instead of through healthy brain tissue enabling minimally invasive treatment of tumors, cysts, hydrocephalus and epileptogenic lesions. Twenty percent of brain tumors lie either adjacent to, or inside, the ventricles, and endoscopy has had a major impact in their treatment leading to reductions in morbidity and procedure time.

Current neurosurgical technology, however, forces the surgeon to trade off the amount of diseased tissue resected with the amount of eloquent tissue sacrificed. This tradeoff is often equivalent to balancing a patient's quantity and quality of life. Improvements in endoscopic technology could extend its use to transventricular resection of parenchymal brain lesions, which would enhance patient safety remarkably, especially in dealing with deep lesions. While currently only about 1% of intracranial procedures can be treated endoscopically, we anticipate that the proposed technology could increase this to 10%. In avoiding open surgery, our technology would reduce brain retraction and parenchymal injury, thus decreasing neurological deficits and hospitalization time.

SUMMARY

The present disclosure relates to bimanual neuroendoscopic robotic devices. One such robotic device, in various embodiments, may comprise a support structure; a robotic arm coupled to the support structure and having a working channel extending from a proximal end to a distal end of the robotic arm; a drive system coupled to the support structure; and a tool module configured to detachably couple to the drive system, the tool module comprising an elongate tool configured to be advanced through the working channel to a surgical site at the distal end of the robotic arm and subsequently removed from the robotic arm without having to withdraw the robotic arm from the surgical site, and a transmission configured to operatively connect the drive system and the elongate tool when the tool module is coupled with the drive system thereby providing for operation of the elongate tool by the drive system.

In various embodiments, the robotic arm may be one of a concentric tube robotic arm, a tendon-driven robotic arm, or a multi-backbone robotic arm. The elongate tool, in various embodiments, may include an elongate member, a tool member, and a transmission element. The transmission, in various embodiments, may be operable to rotate and operate the elongate tool. In various embodiments, the drive system may include one or more motors configured to deliver power to the transmission of the tool module. The drive system, in various embodiments, may further include a rail system along which the tool module translates to advance and withdraw the elongate tool at the surgical site.

The robotic device, in various embodiments, may comprise two or more robotic arms and a corresponding number of tool modules. The support structure, in an embodiment, may include two or more bearings for guiding the two or more robotic arms into substantially parallel alignment for advancement to a surgical site. In another embodiment, the robotic arm may be provided as part of a detachable robotic arm module including a transmission configured to be coupled to the drive system for rotating at least a portion of the robotic arm. The drive system, in another embodiment, is operable to provide coupled or independent translation of the robotic arm module and the tool module.

In another aspect, the present disclosure is directed to a robotic device comprising a first robotic arm module comprising a first tube and a first transmission configured to rotate the first tube; a second robotic arm module comprising a second tube and a second transmission configured to rotate the second tube, the second tube configured to be inserted into the first tube to form a concentric tube arm; and a drive system configured for rotating the first tube and the second tube via the first transmission and the second transmission, respectively, and for translating the first arm module and the second arm module to advance and withdraw the first tube and the second tube.

The robotic device, in various embodiments, may comprise one or more sterile barriers separating the first and second robotic arm modules from the drive system, respectively. In an embodiment, the drive system may be configured to rotate the first tube independent of the second tube. The drive system, in another embodiment, may be configured to translate the first arm module independent of the second arm module, and the concentric tube arm may be configured to extend and retract in a telescoping manner. In various embodiments, the concentric tube arm may include a working channel.

The robotic device, in various embodiments, may include a tool module having an elongate tool dimensioned to be advanced and withdrawn through the working channel of the robotic arm. The tool module, in an embodiment, may include a transmission configured to detachably couple to the drive system for rotating and/or operating the tool. The drive system, in an embodiment, may be configured to translate the tool module and second arm module in unison. In another embodiment, the drive system is configured to translate the tool module and the second arm module independently. In various embodiments, the drive system includes at least one motor, at least one cart, and a rail system.

In another aspect, the present disclosure is directed to a robotic device comprising a robotic arm module comprising a concentric tube arm and a transmission configured to rotate at least one tube of the concentric tube arm; a drive system configured for rotating the at least one tube via the transmission and for translating the robotic arm module to advance and withdraw the concentric tube arm; and one or more sterile barriers separating the robotic arm module from the drive system.

The drive system, in an embodiment, may be configured to rotate a first tube of the concentric tube arm independent of a second tube of the concentric tube arm. In various embodiments, the concentric tube arm may include a working channel. The robotic device, in another embodiment, may include a tool module having an elongate tool dimensioned to be advanced and withdrawn through the working channel of the concentric tube arm.

In various embodiments, the drive system may be configured to translate the tool module and arm module in unison. In another embodiment, the drive system may be configured to translate the tool module and the arm module independently. In various embodiments, the drive system may include at least one motor, at least one cart, and a rail system.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Embodiments of the present disclosure are directed to robotic devices for performing medical procedures and, in particular, minimally invasive procedures within the body such as brain and cardiac surgeries. The robotic devices described herein generally include robotically steerable arms that are positioned close enough together to be advanced to a surgical site inside of a sheath (e.g., endoscope, catheter, or other minimally invasive approaches) while also maintaining sufficient dexterity to provide overlapping workspaces at the surgical site for exceptional bimanual control during a procedure. The robotic arms and tools used by the robotic device are provided as part of a modular architecture that allows the robotic device to be quickly and easily reconfigured for various steps of a given procedure and for other procedures altogether. Modularity of the design also allows for tools to be swapped in and out without removing the robotic arms from the surgical site, thereby greatly enhancing the speed, ease, and safety of a procedure, and also allows sterile components to be easily separated from non-sterile components and provided as disposables. Such modularity can also be applied to robotic catheter applications in which a single robotic arm is used. Combined, these and other features of the robotic devices of the present disclosure provide many advantages over existing approaches, as further described in more detail herein. While neurosurgical applications are detailed here, it should be noted that this technology extends to other clinical applications throughout the body, such as interventional cardiology and cardiac surgery.

Robotic Device 100

Figure 1:
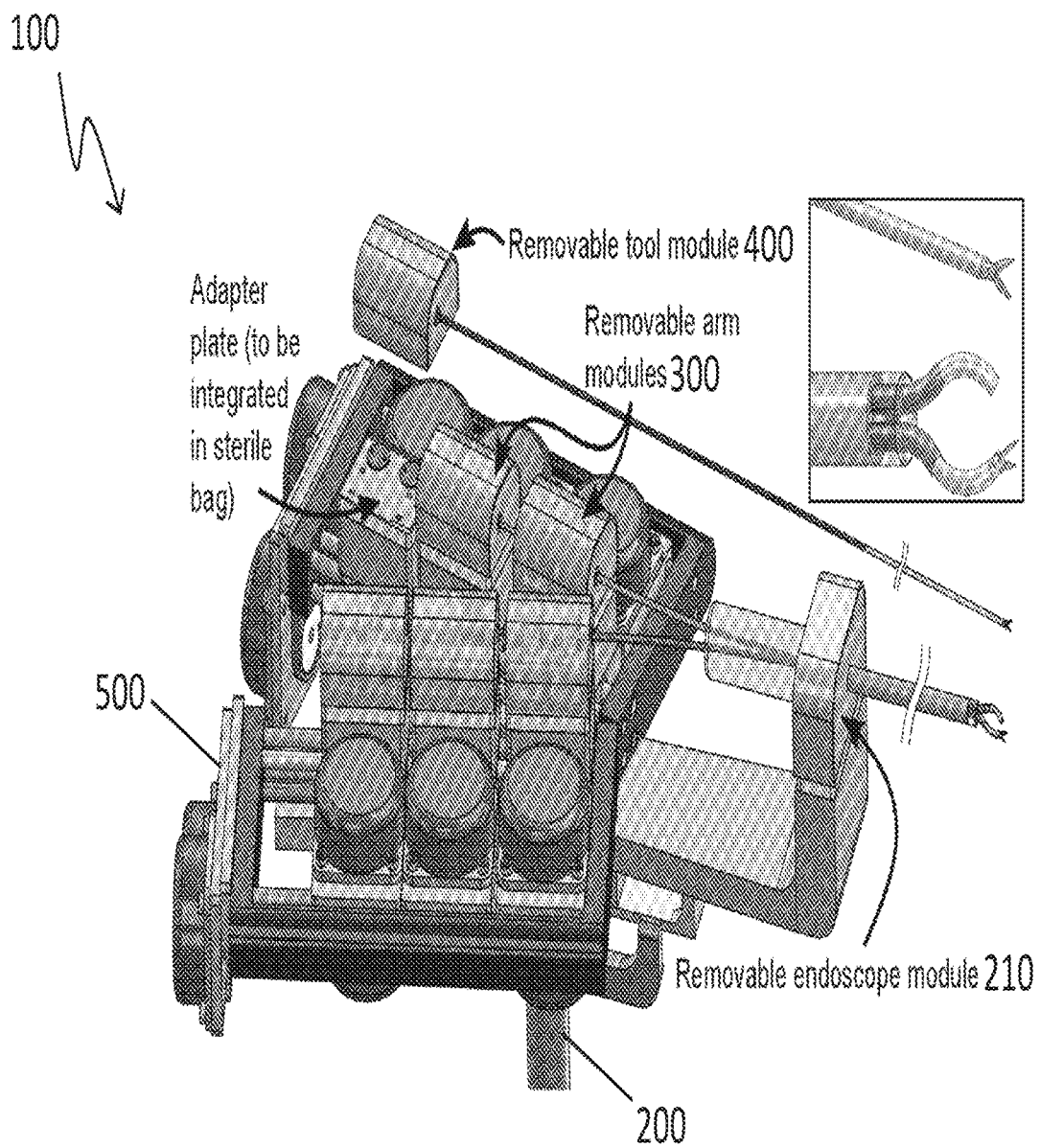
FIG. 1 illustrates a representative embodiment of a robotic device, including a support structure, one or more robotic arm modules, one or more tool modules, and a drive system.

FIG. 1 illustrates a representative embodiment of robotic device 100. Robotic device 100 of the present disclosure may generally include a support structure 200, one or more robotic arm modules 300, one or more tool modules 400, and a drive system 500. In various embodiments, each robotic arm module 300 and tool module 400 may detachably couple to support structure 200 and are operated by drive system 500 to perform a surgical procedure. As later described in more detail, robotic arm module(s) 300 may include a robotic arm 310 (later shown) having working channel 311 (later shown) for accommodating an elongate tool 410 (later shown) of tool module 400 and robotic arm 310 can be steered about a surgical site to position and orient a distal end of elongate tool 410 during the procedure. As configured, elongate tool 410, in various embodiments, may be removed from working channel 311 of robotic arm 310 during the procedure without having to withdraw robotic arm module 300 from the surgical site, thereby allowing tool modules 400 to be swapped in and out during a procedure and medical devices (e.g., stents) to be implanted through working channel 311 with ease and speed. In various embodiments, multiple robotic arms 310 can be directed through an endoscope (shown), catheter, or other structure for navigation to the surgical site.

Figure 2:
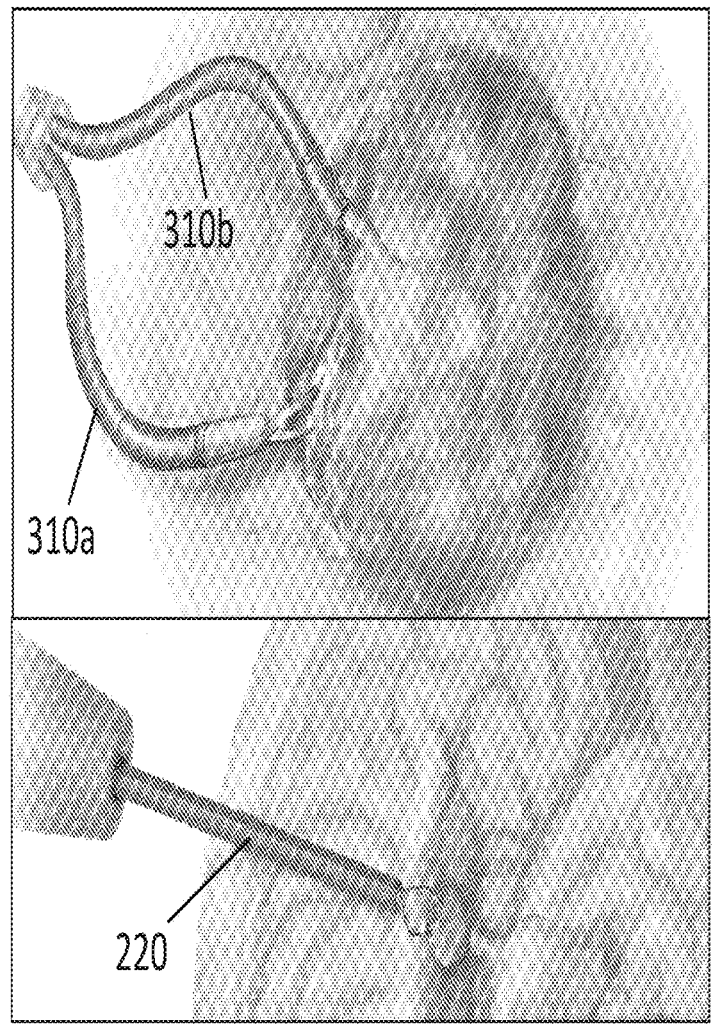
FIG. 2 illustrates an embodiment of a robotic device performing a procedure at a surgical site.

FIG. 2 illustrates an embodiment of robotic device 100 performing a procedure at a surgical site. In the embodiment shown, robotic device 100 includes two robotic arms 310a, 310b extending from a distal end of an endoscope (camera shown) and equipped with shears and forceps, respectively.

Figure 3:
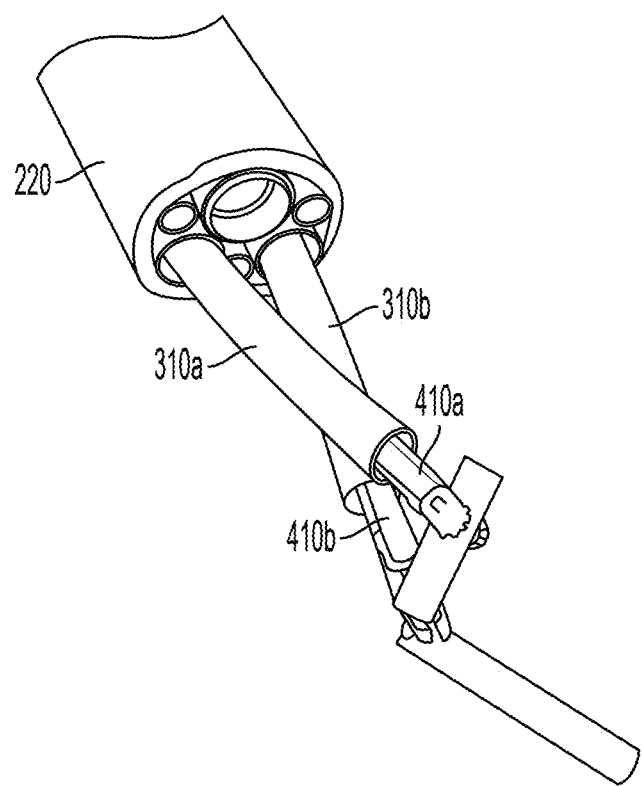
FIG. 3 illustrates an embodiment of a robotic device configured to manipulate and cut a blood vessel.

As configured, robotic device 100 can perform minimally invasive procedures with imaging and bimanual dexterity at the surgical site, a combination that greatly enhances the speed, control, and ease with which a minimally invasive procedure can be performed. FIG. 3 depicts a similar embodiment of robotic device 100 configured to manipulate and cut a blood vessel (represented here by a red plastic tube) and, by way of example, further illustrates these capabilities. In particular, as shown in FIG. 3, robotic arm 310a contains forceps 410a configured to grasp the blood vessel and move the blood vessel away from surrounding tissue so that shears 410b protruding from robotic arm 310b can safely sever the blood vessel.

The imaging system need not be limited to the endoscopic sheath, but can also be incorporated into tool module 400 such that it is adjacent to the tool 410 or integrated into part of the tool 410. For example, in cardiac catheter applications, cardioscopic imaging inside the blood-filled heart can be accomplished by pressing the optical window of the imaging system against the tissue inside the blood-filled heart such that the blood is displaced and a clear image of the contacted tissue is produced (see, e.g., U.S. patent application Ser. No. 15/158,475, which is incorporated by reference herein in its entirety). The imaging system can include a delivery channel for deploying a device inside the heart or can consist of a tool, e.g., forceps, with the imaging system embedded in the forceps fingers to enable visualization of what is being grasped. In this context, the ability to swap tool modules 400 without removing robotic arms 310 from the vasculature and heart is highly beneficial. For example, device deployment may require delivering a sequence of components, each of which may use its own delivery tool 410. In addition, if the imaging system or tool 410 malfunctions, swappable tool modules 400 enable the procedure to continue with minimal disruption.

Support Structure 200

Support structure 200 may comprise any structure suitable for supporting or otherwise positioning components of robotic device 100 relative to one another to provide the configurations and functionality described herein. Referring back to FIG. 1, in various embodiments, support structure 200 may include a platform supported from below by a vertical post extending from the floor, as shown. In another embodiment (not shown), support structure 200 may instead support robotic device 100 from above and be suspended from a ceiling. It should be recognized that the present disclosure is not intended to be limited to any particular support structure 200 so long as support structure 200 provides for detachably coupling robotic arm modules 300 and tool modules 400 to drive system 500 for operation as described herein.

Figure 4:
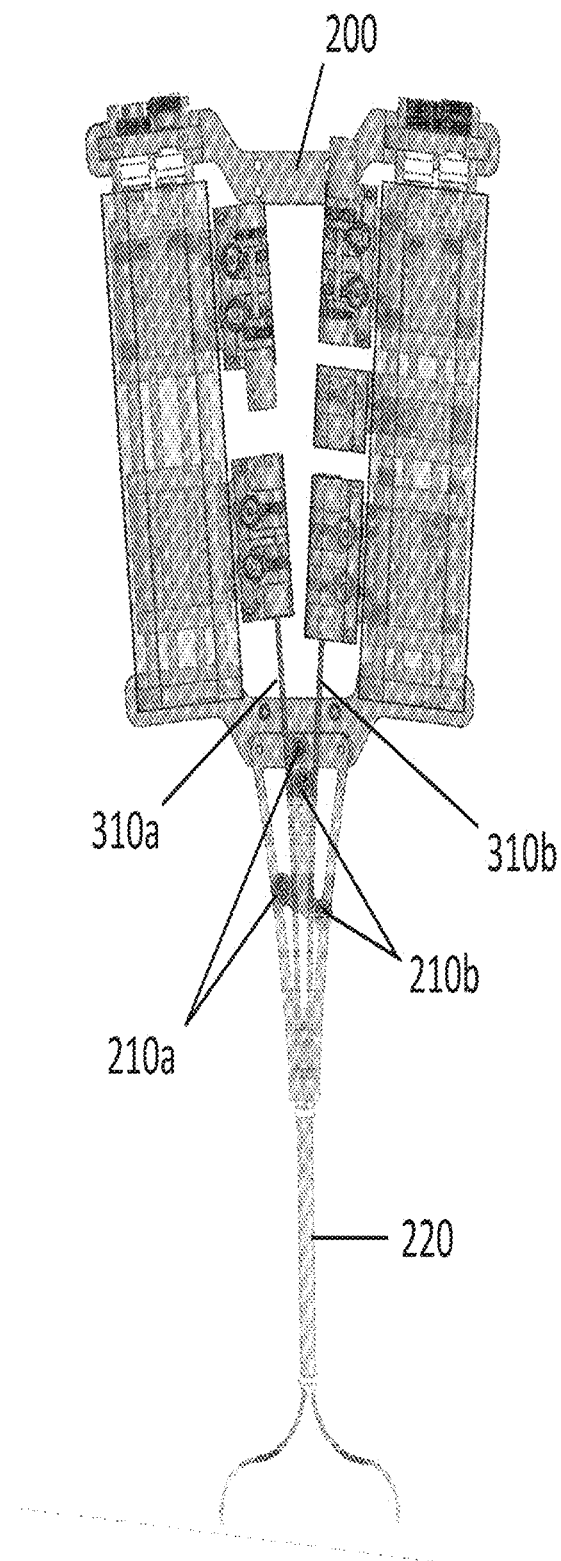
FIG. 4 illustrates a representative embodiment of a support structure, including a platform or frame on which a drive system, robotic arm modules, and tool modules are mounted.

FIG. 4 illustrates a representative embodiment of support structure 200 including a platform or frame on which drive system 500, robotic arm modules 300, and tool modules 400 are mounted. Support structure 200, in various embodiments, may position and orient these components such that robotic arms 310a, 310b converge such that they can be inserted into a sheath, catheter, endoscope 220, etc. and navigated to the surgical site using minimally invasive methods. The challenge of combining robotic arms 310 side-by side inside a sheath is that the mechanical components of robotic arm modules 300 and drive system 500 are much larger than the arm 310 diameter creating spatial overlap between the components. To provide sufficient clearance for drive components, the proximal ends of robotic arms 310 may be spaced apart from one another and robotic arms 310 may be oriented such that they angle toward each other as they approach endoscope 220. These proximal portions of robotic arms 310 curve gently around bearings 210 to enter endoscope 220 along parallel axes. Bearings 210, in various embodiments, may be positioned such that the proximal portions of robotic arms 310 remain in elastic bending and so do not deform.

Notice that while two arms are shown, the proposed design allows for more arms, which could be used to deploy tools or an endoscopic imaging system. In this case, support structure 200 could be configured in a conical shape to position drive systems 500 and associated robotic arm modules 300 and tool modules 400 about a common longitudinal axis such that robotic arms 310 converge at the point of the imaginary conical plane.

Robotic Arm Modules 300

Figure 5:
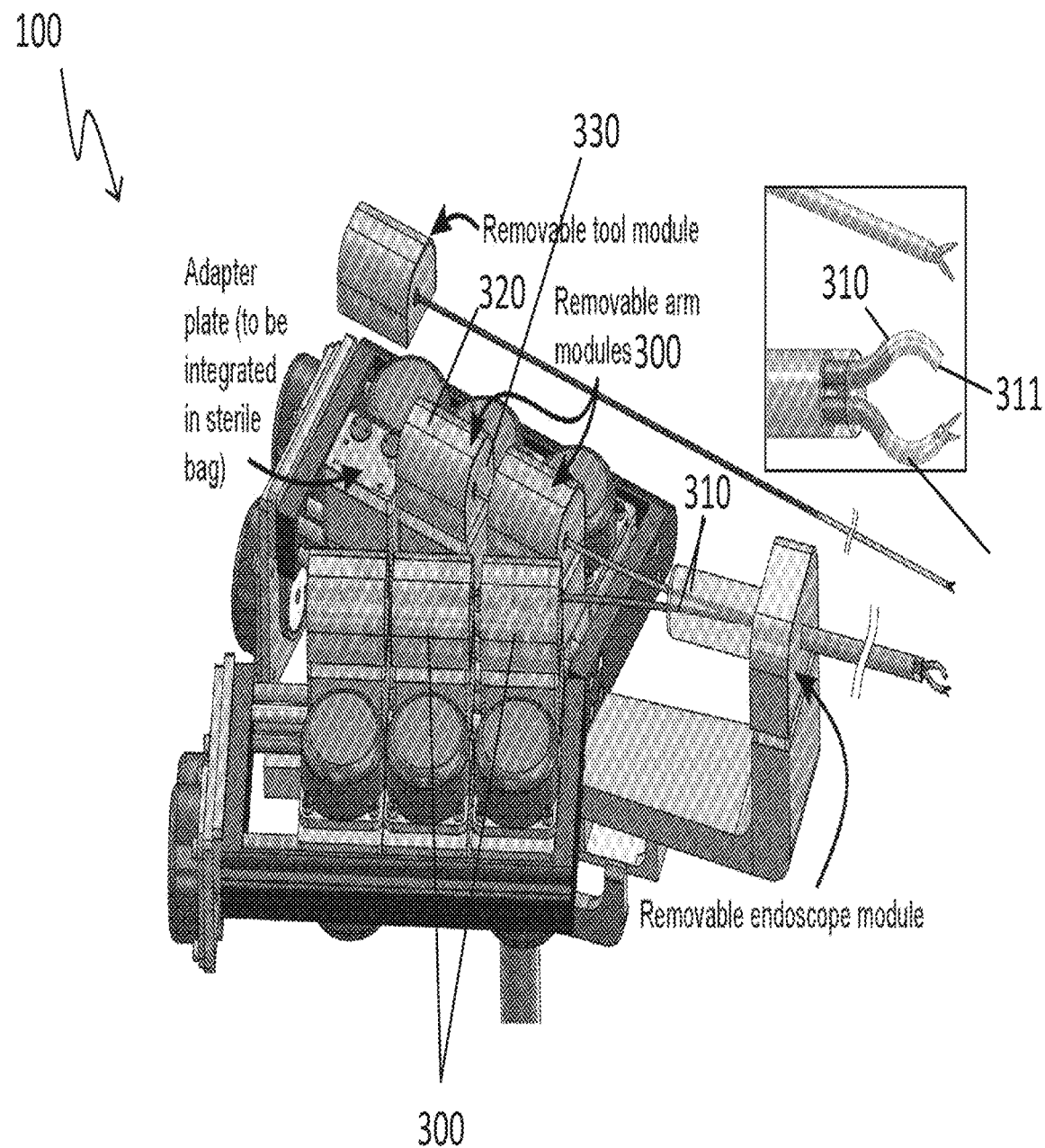
FIG. 5 illustrates a representative embodiment of a robotic device having four robotic arm modules and two tool modules.

FIG. 5 illustrates a representative embodiment of robotic device 100 having four robotic arm modules 300 and two tool modules 400. Each robotic arm module 300, in various embodiments, may generally comprise a robotic arm 310 and a transmission 320. As later shown and described in more detail, transmission 320 may be positioned near a proximal end of robotic arm 310 and configured to operatively connect robotic arm 310 to drive system 500 to provide for operation of the robotic arm by drive system 500. Transmission 320, in various embodiments, may be contained within a housing 330 configured to detachably couple robotic arm module 300 to support structure 200 (in some embodiments, via drive system 500) in a modular fashion. In various embodiments, robotic arm modules 300 may be of similar shape, size, and configuration as one another so as to be used interchangeably in various mounting locations on robotic device 100.

Robotic Arm 310

Figure 6:
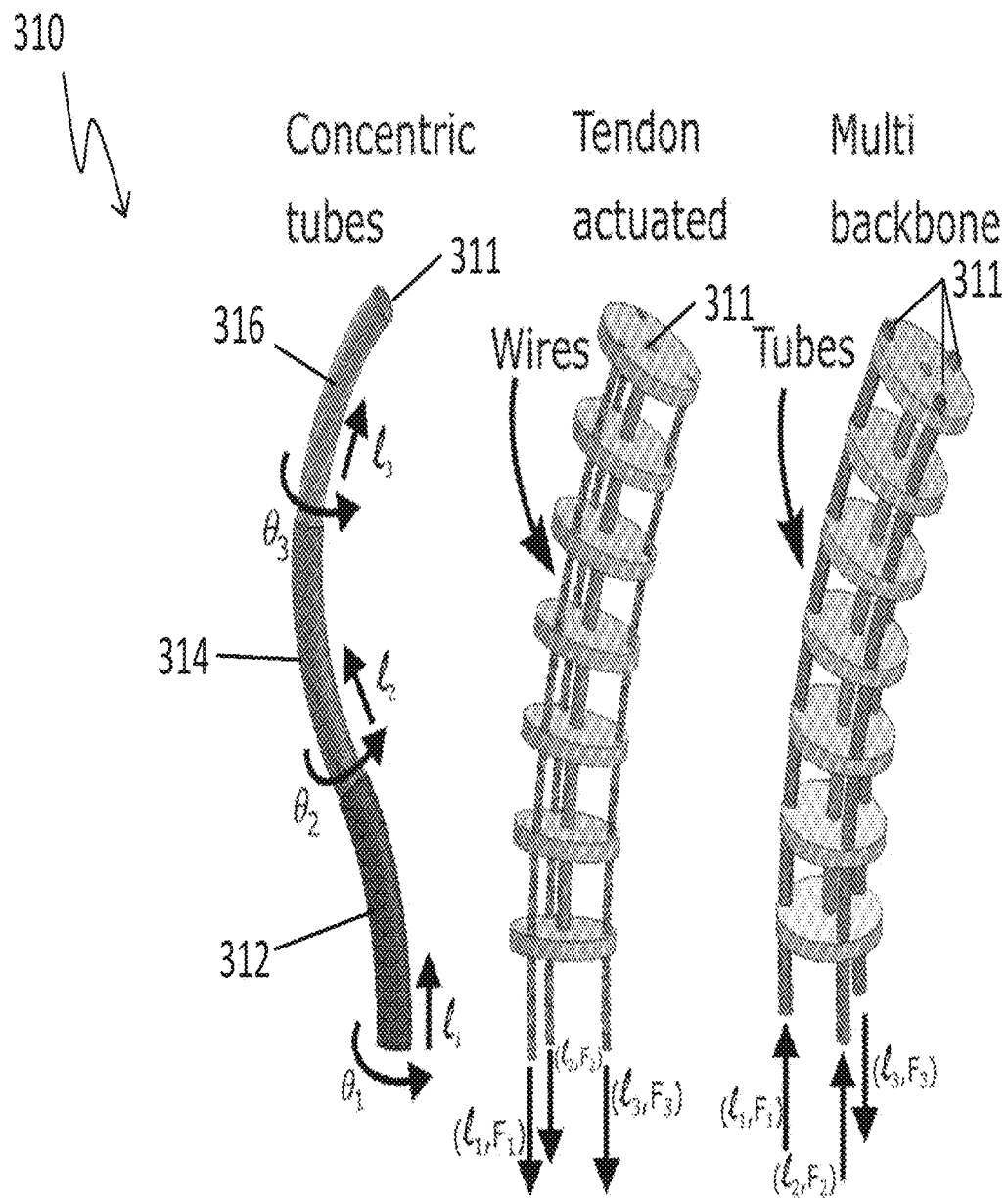
FIG. 6 depicts three representative designs of the robotic arms.

FIG. 6 depicts three representative designs of robotic arms 310 of the present disclosure. The robot arms 310 can be designed using a variety of robot architectures. For example, continuum robots are a type of robot with a shape given by a smooth curve. Concentric tube robots are comprised of concentrically-combined pre-curved tubes whose overall shape is controlled by relative rotation and translation of the tubes at their base (see, e.g., U.S. Pat. No. 7,883,475B2 which is incorporated by reference herein in its entirety). In concentric tube embodiments, robotic arm 310 may be comprised of two or more tubes (e.g., tubes 312, 314, 316 shown). Each tube may be pre-curved to maximize volume (workspace) through which each robotic arm 310 can move and also to ensure overlap between workspaces of two robotic arms 310 as later shown in FIG. 7. As configured, a surgeon will be able to perform bimanual tasks. While robotic arms 310 (and the associated modules 300) are often described in the context of concentric tube robots, it should be understood that any other suitable architecture such as tendon-actuated and multi-backbone designs could also be used. In these latter designs, the shape of robotic arm 310 may be controlled by pulling on tendon wires or pushing/pulling on tubular backbones. For example, manually-controlled cardiac electrophysiology catheters are tendon actuated.

Referring back to FIG. 5, robotic arm 310 of the present disclosure may include a working channel 311 extending therethrough from a proximal end to a distal end. Working channel 311 may be sized to accommodate tool 410 of tool module 400. In particular, in various embodiments, tool 410 may be inserted into working channel 311 from the proximal end of robotic arm 310 and advanced therethrough to a surgical site at the distal end of robotic arm 310. Note that FIG. 5 illustrates one robotic arm 310 with tool module 400 removed (top) and the other robotic arm 310 with tool module 400 inserted such that tool 410 (e.g., shears) extend from the distal end of the associated robotic arm 310 (bottom). In concentric tube robotic arms 310, each tube may be substantially hollow and aligned to form a common working channel 311 extending through the concentric tube robotic arm 310, as shown.

As configured, elongate tool 410, in various embodiments, may be removed from working channel 311 of robotic arm 310 during the procedure without having to withdraw robotic arm module 300 from the surgical site, thereby allowing tool modules 400 to be swapped in and out during a procedure and medical devices (e.g., stents) to be implanted through working channel 311 with ease and speed.

Figure 7:
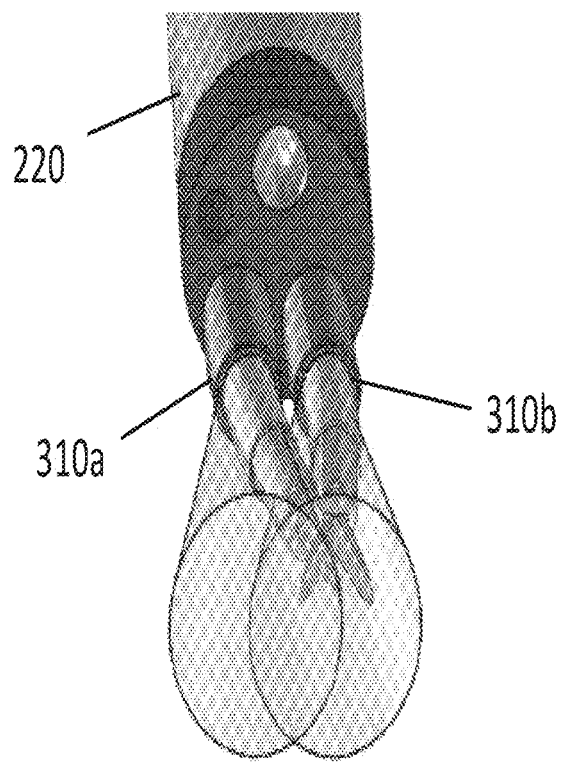
FIG. 7 depicts cones indicating a representative range of motion of the robotic arms.

FIG. 7 depicts cones indicating a representative range of motion of robotic arms 310 of the present disclosure. In various embodiments, each robotic arm 310 may possess degrees of freedom for rotating about its axis (roll motion) as well as to achieve bending along its length. For example, a tendon-driven arm module may comprise, e.g., one, two, three or four tendons which are coiled on spools within the module—by adjusting the length or tension of the tendons, the shape and stiffness of the robotic arm 310 can be controlled. As shown, the respective ranges of motion of each robotic arm 310 may intersect with one another, such that tools 410 extending from a distal end of each robotic arm 310 can be placed next to each other to perform bimanual tasks.

Figure 8:
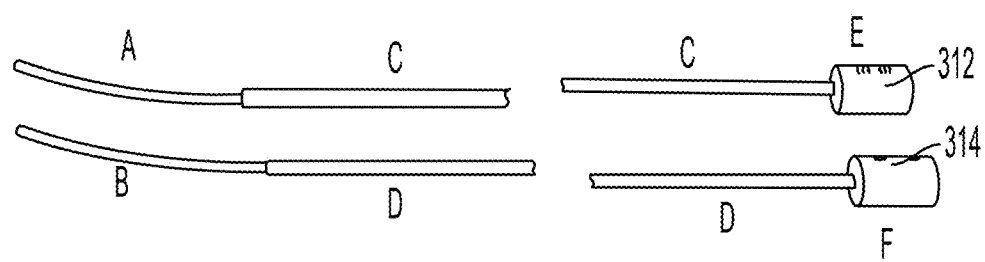
FIG. 8 depicts a disassembled two-tube concentric robot arm.
Figure 9:
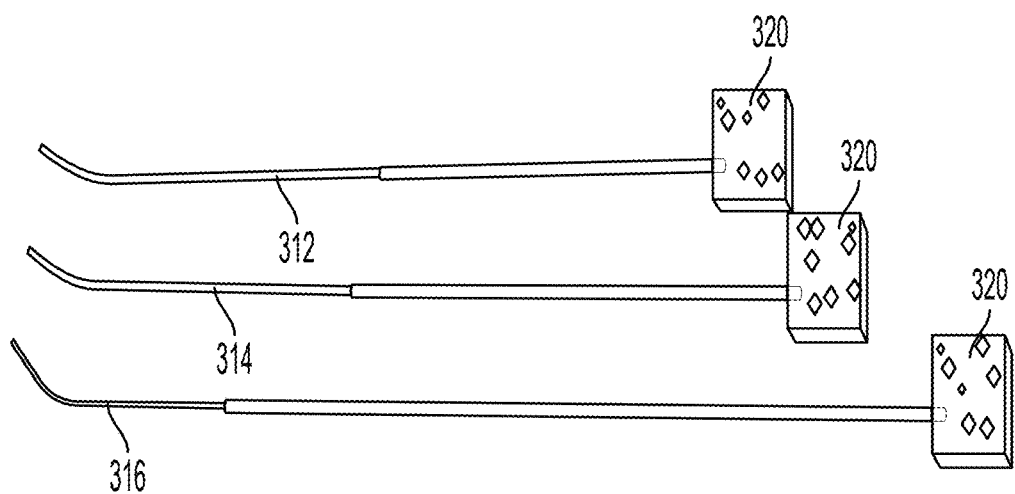
FIG. 9 depicts a disassembled three-tube concentric robot arm.

FIG. 8 depicts a disassembled two-tube concentric robot arm 310 comprising tubes 312, 314. In comparing designs comprised of two and three tubes, we found that the workspace was only incrementally larger with three tubes. Sections A & B of tubes 312, 314 may be constructed of nickel titanium alloy (NiTi, or Nitanol) and may have equal pre-curvature and bending stiffness. Sections C & D may be constructed of stainless steel. Components E & F are couplers for mounting tubes 312, 314 in the robotic arm modules 300. In a representative construction, pre-curved NiTi tubes (A, B) may be glued using lap joints to stainless steel tubes (C, D). Stainless steel is typically stiffer and less expensive than NiTi, and thus may be used to provide proximal sections C, D with additional torsional and/or bending stiffness. Collars (E, F) may be glued to the stainless steel tubes C, D and are used to lock the tubes into robotic arm modules 300. By rotating the two tubes 312, 314 with respect to each other, their assembled curvature varies from straight to a maximum value corresponding to the pre-curvature shown. Each assembled robot arm 310 can also be rotated about its axis to trace out the surface of the cones shown in FIG. 7. In addition, each robotic arm 310 can be extended from and retracted into the endoscope. FIG. 9 depicts a disassembled three-tube concentric robot arm 310 comprising tubes 312, 314, 316.

Transmission 320

Figure 10:
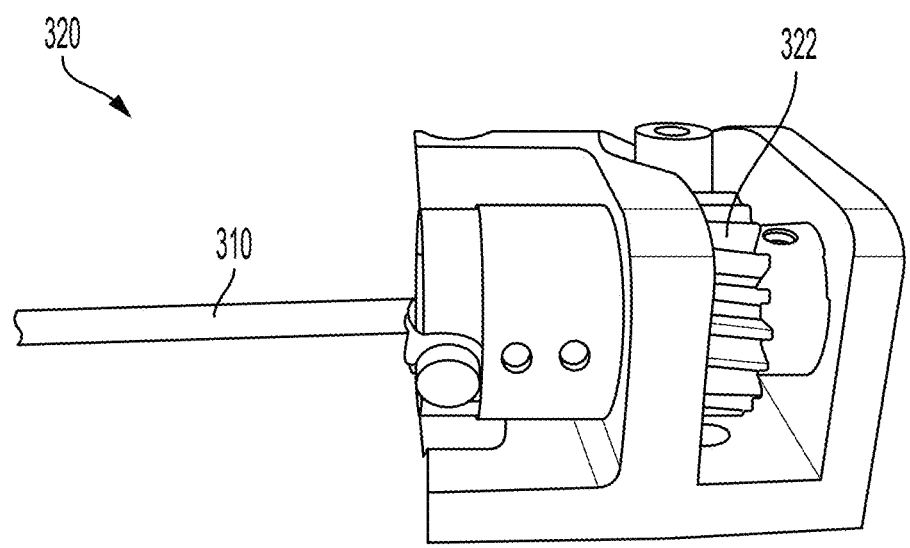
FIG. 10 depicts a representative transmission for a single tube robot arm module.
Figure 11:
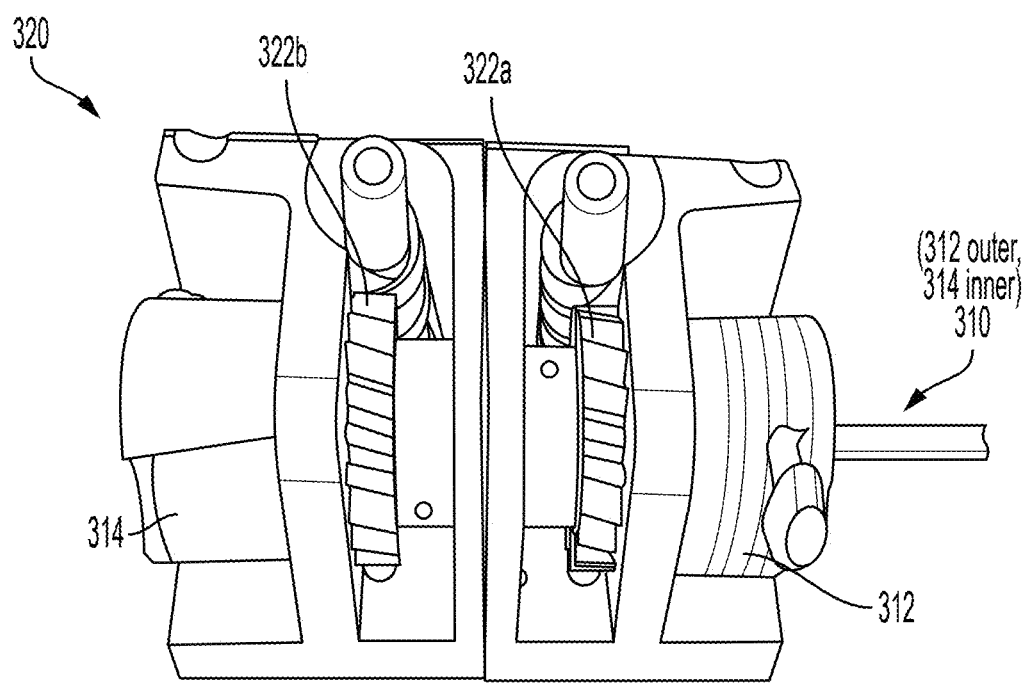
FIG. 11 depicts a representative transmission for a two tube robot arm module.

FIG. 10 depicts a representative transmission 320 for a single tube robotic arm module 300 and FIG. 11 depicts a representative transmission 320 for a two tube robotic arm module 300. Transmission 320, in various embodiments, may be positioned near a proximal end of robotic arm 310 and configured to operatively connect robotic arm 310 to drive system 500 to provide for operation of robotic arm 310 by drive system 500.

As shown in FIG. 10 and FIG. 11, transmission 320, in various embodiments, may include one or more gears 322. Gear(s) 322 may be coupled to robotic arm 310 such that when gear(s) 322 are turned by drive system 500, motion is imparted to robotic arm 310. In various embodiments, transmission 320 may be configured to impart rotational motion to robotic arm 310. For example, as shown in FIG. 10, gear 322 and robotic arm 310 may share a common rotational axis such that when gear 322 is rotated by drive system 500, robotic arm 310 in turn rotates along its longitudinal axis. A similar design is shown in FIG. 11; however, in the two-tube concentric robot embodiment shown, a first gear 322a is coupled to a first tube 312 and a second gear 322b is coupled to a second tube 314 such that each tube 312, 314 can be independently rotated by drive system 500. In an embodiment, transmission 320 may be configured to rotate two or more tubes of a concentric tube robot together (rather than independently) via a common gear 322 coupled to the two or more tubes (not shown).

It should be recognized that transmission 322 may of course be made of any suitable number and arrangement of mechanical components for imparting motion to robotic arm 310 when actuated by drive system 500 and the present disclosure is not intended to be limited to the particular numbers or arrangements of gears shown in the representative embodiments herein.

Tool Modules 400

Figure 12:
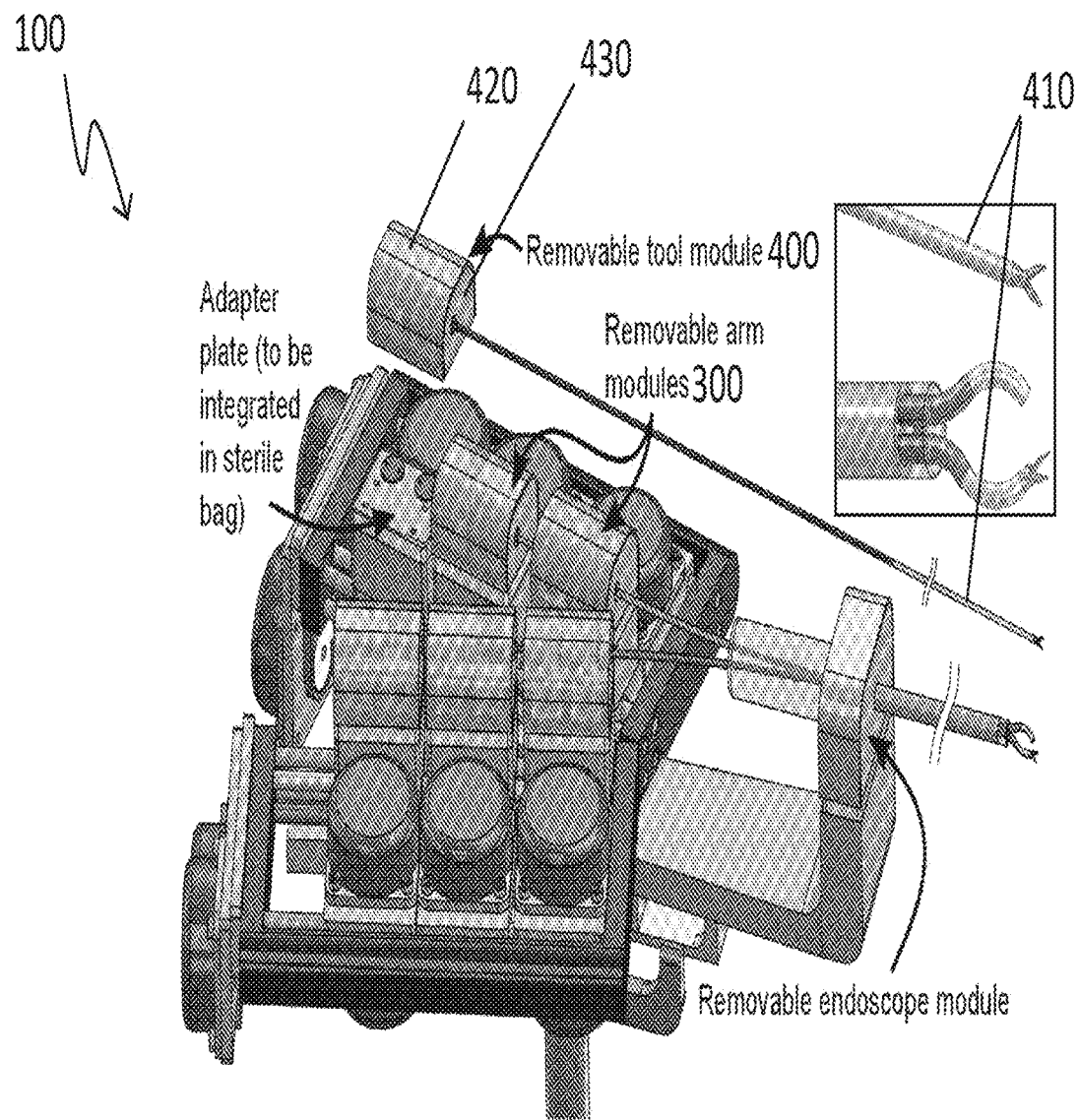
FIG. 12 illustrates the relevant components of the robotic device's tool modules, including an elongate tool and a transmission.

FIG. 12 illustrates the robotic device 100 of FIG. 5, relabeled here to identify relevant components of tool modules 400. Each tool module 400, in various embodiments, may generally comprise an elongate tool 410 and a transmission 420. Like transmission 320 of robotic arm module 300, transmission 420 of tool module 400 may be positioned near a proximal end of elongate tool 410 and configured to operatively connect elongate tool 410 to drive system 500 to provide for operation of the elongate tool 410. Transmission 420, in various embodiments, may be contained within a housing 430 configured to detachably couple tool module 400 to support structure 200 (in some embodiments, via drive system 500) in a modular fashion. In various embodiments, tool modules 400 may be of similar shape, size, and configuration as one another so as to be used interchangeably in various mounting locations on robotic device 100.

Elongate Tool 410

Figure 13:
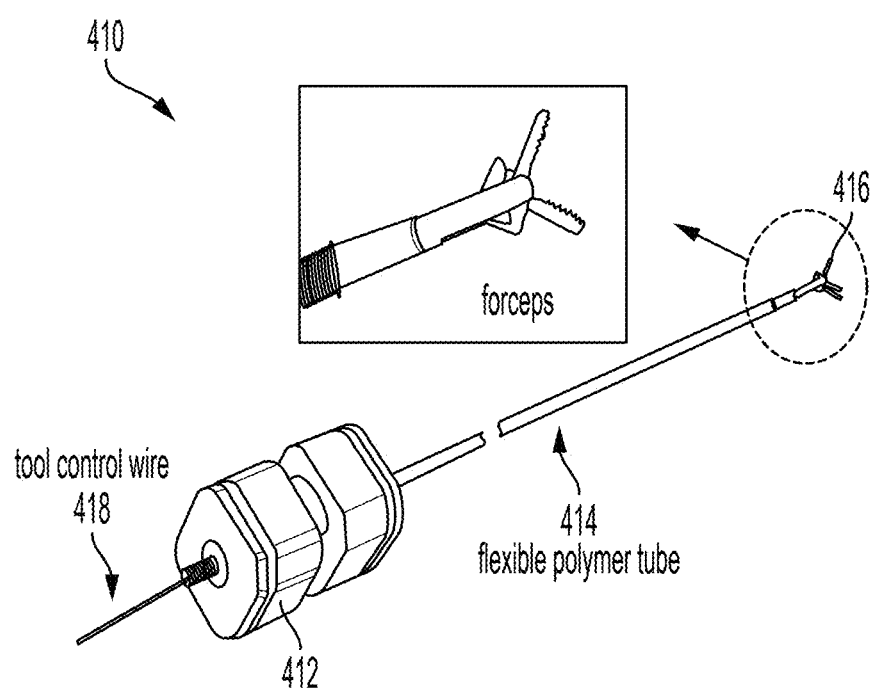
FIG. 13 depicts a representative elongate tool comprising a collar, elongate member, and a tool member.

FIG. 13 depicts a representative elongate tool 410 of the present disclosure. Elongate tool, in various embodiments, may comprise a collar 412, elongate member 414 (e.g., flexible polymer tube), and a tool member 416 (e.g., forceps) at a distal end of the elongate member 414. Tool member 416 may be operatively connected to transmission element 418 (e.g., tool control wire) for controlling operation of tool member 416, as shown. Standard surgical tools 416 such as forceps and scissors are operated using a push+pull wire 418 running through a tube 414 to which the tool member 416 is attached. In various embodiments, elongate member 414 may be flexible in order to pass through the curving proximal portions and the distal actuated portions of robotic arms 310. In some embodiments, elongate tool 410 may additionally or alternatively comprise bipolar cautery leads 416 or another tool(s) that utilizes electrical energy, laser energy (e.g., laser light transmitted down the tool through an optical fiber) or other forms of energy. Such embodiments may include connectors 418 (e.g., wires, optical fibers) that run along, inside, or within the tube 414 to the module 400 where connectors are integrated with drive system 500, as later described in more detail. In an embodiment, tool control wire 418 may also provide an electrical connection.

Transmission 420

Figure 14:
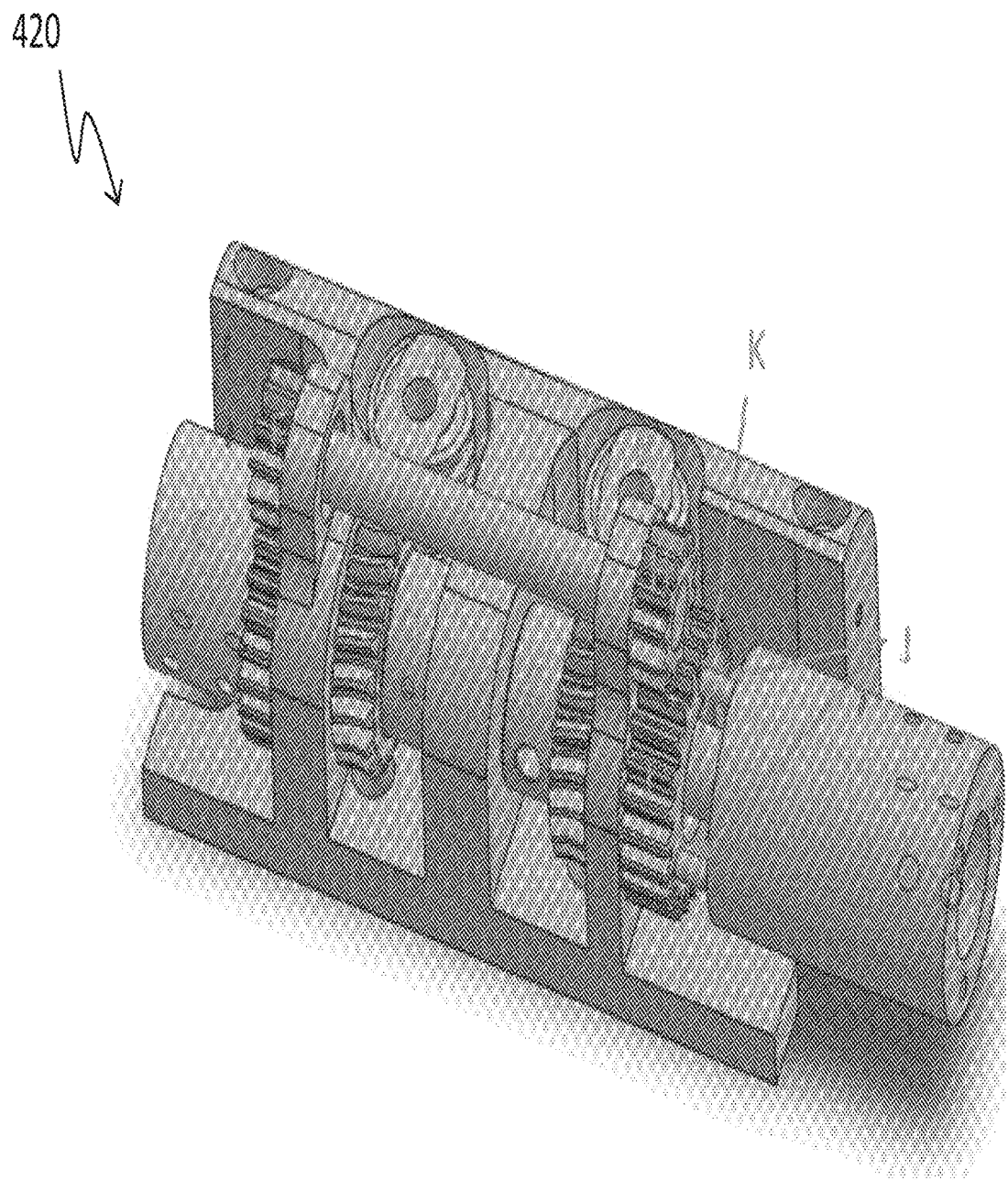
FIG. 14 and FIG. 15 illustrate a representative embodiment of the transmission of the tool module.
Figure 15:
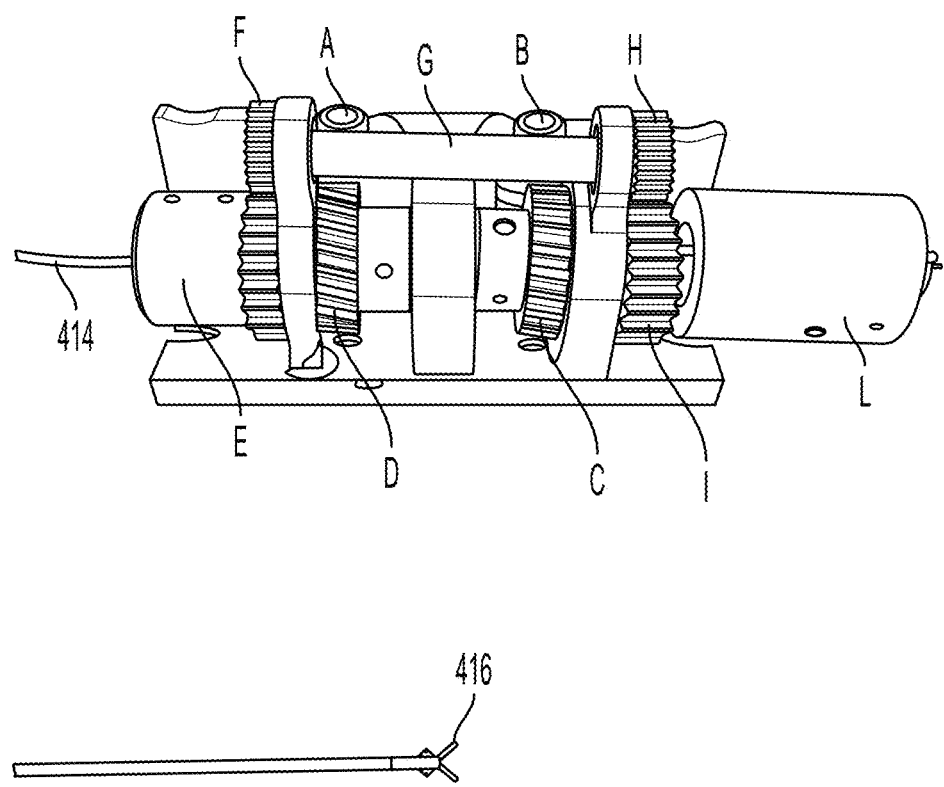

FIG. 14 and FIG. 15 illustrate a representative embodiment of transmission 420 of tool module 400. Transmission 420, in the embodiment shown, is configured to provide synchronous rotation/coupled translation. A geared shaft (G) synchronizes rotation of the tool 416 and push/pull wire 418. This enables infinite rotation of the tool 416 without twisting of the push/pull wire 418. Worm gears (A) and (B) are coupled to motors 510 of drive system 500 through Hirth couplings as later shown in FIG. 18C and FIG. 20, driving gears (C) and (D) respectively. Part (E) holds the collar 412 attached to the tool shaft 412 and (L) holds the coupler to the push/pull wire.

To operate the push/pull cable 418 to open and close the gripper 416, gear (C) spins, spinning leadscrew (K) which translates (L) axially thereby pushing or pulling the push/pull cable 418. (L) slides along three steel rods (J) as it translates.

Gear (D) turns coupler (E) which rotates elongate tool 410. (E) and (L) roll are locked in synchrony to ensure that as (E) rolls, the push/pull cable does not wind up. This is achieved by the following approach: As (E) turns, it engages gear train (E-F-G-H-I), therefore rotating (I) with a 1:1 ratio to (E). As (I) rotates, it rotates bearing rods (J) which rotates coupler (L). As coupler (L) rotates, it also translates by consequence on leadscrew (K). A software algorithm may be used to counter-rotate (K) at the proper velocity so as to compensate for unwanted translational motion due to the synchronizing of (E) and (L) roll. We can therefore precisely and independently control tool rotation and tool opening/closing using this or any other suitable mechanism.

Figure 16:
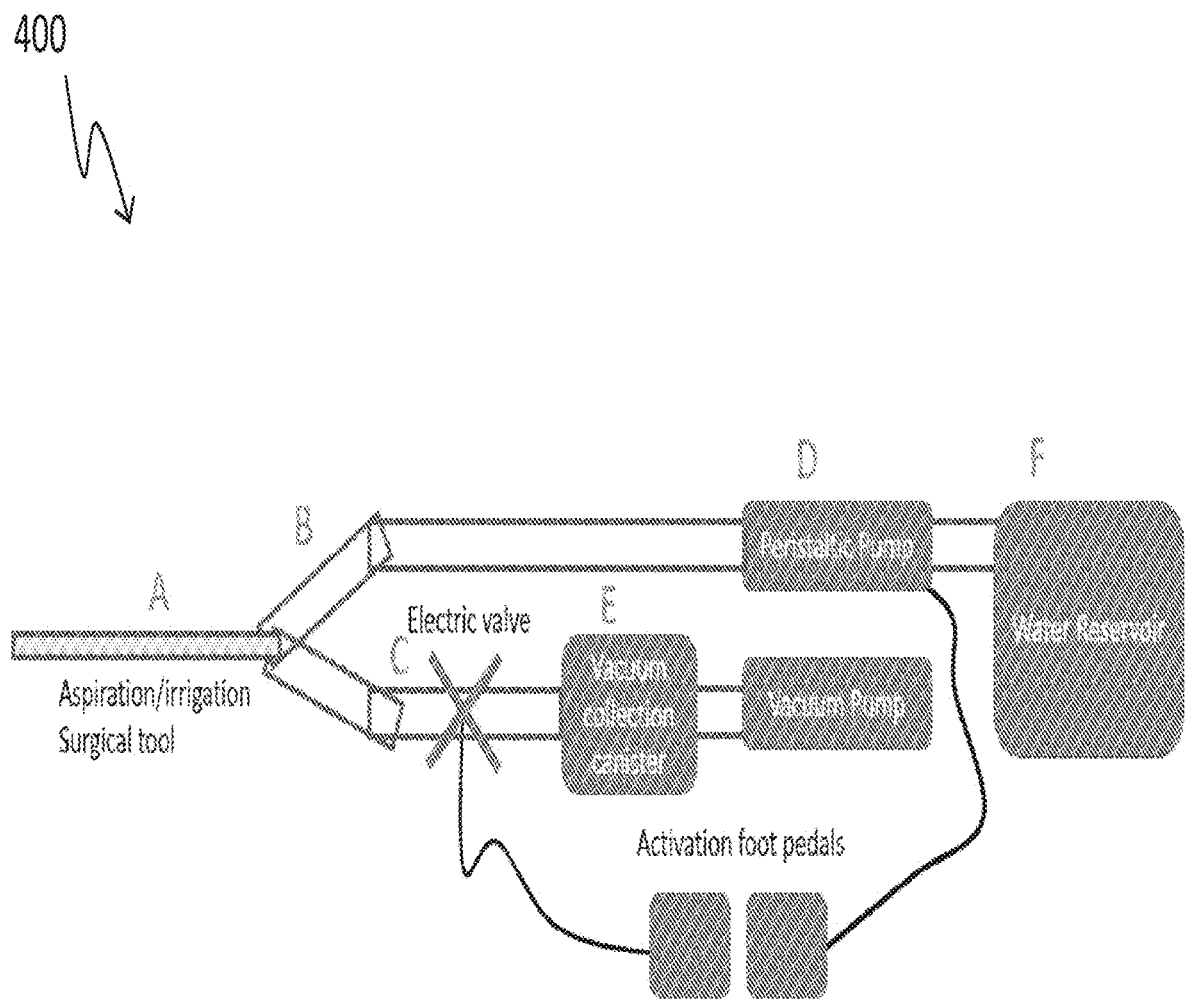
FIG. 16 shows tubes inserted into the arms of the robotic device.

In addition to tools such as forceps, scissors, etc., tubes for providing both irrigation and aspiration can be inserted into either arm, as shown in FIG. 16. For example, a vacuum pump may be connected through a vacuum canister (E) to an electric valve (C). Valve (C) can be controlled by foot switch (G). A peristaltic pump moves water from a reservoir (F) to the Y junction (B). When valve (C) is activated, vacuum is applied to junction (B) and therefore the tool shaft (A). When foot pedal (H) Is pressed, pump (D) is turned on, and water is pumped to junction (B) and into the surgical tool shaft (A).

Drive System 500

Figure 17:
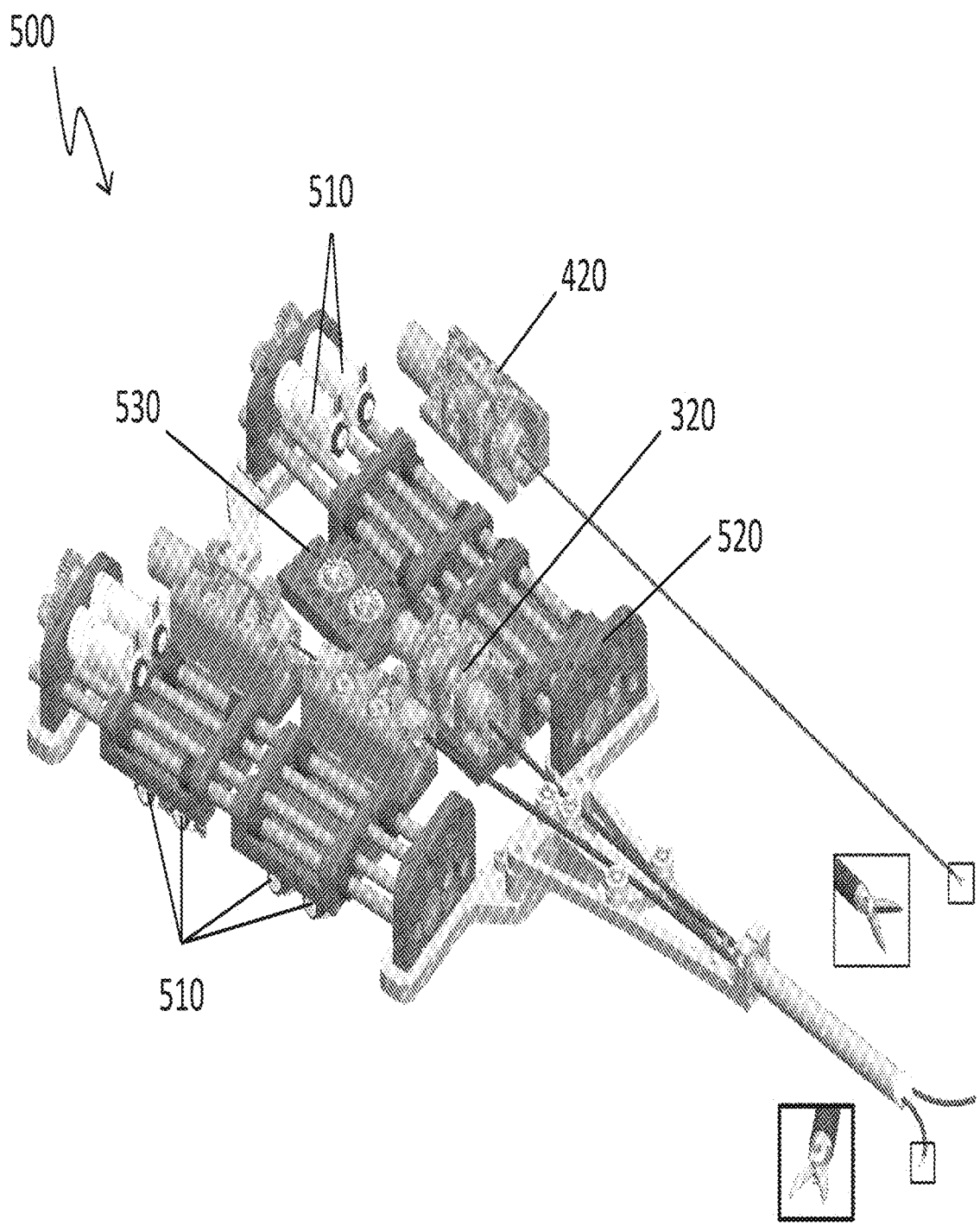
FIG. 17 illustrates a representative drive system of the robotic device.

FIG. 17 illustrates a representative drive system 500 of robotic device 100. Drive system 500 may be configured to operatively connect to transmissions 320 and 420 of robotic arm modules 300 and tool modules 400 for operation of robotic arms 310 and elongate tools 410, respectively. Drive system 500, in various embodiments, may generally include one or more motors 510, a rail system 520, and one or more carts 530. Generally speaking, motors 510 may power robotic arm modules 300 and tool modules 400 as well as movement of carts 530 on rail system 520. As configured, in various embodiments, drive system 500 may provide for rotational and translational steering of robotic arms 310 and elongate tools 410, as further described in more detail herein.

Rotational Steering

Figure 18:
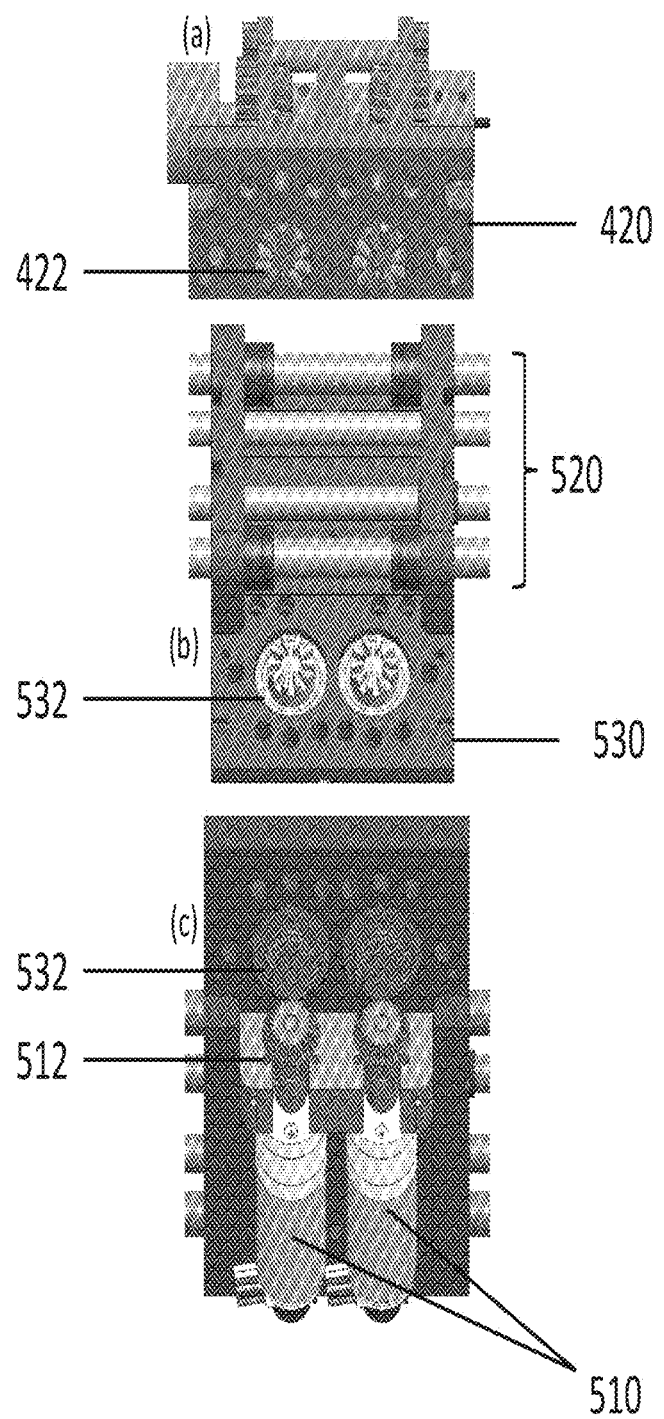
FIG. 18A, FIG. 18B, and FIG. 18C show robotic arm modules and tool modules that may detachably couple to the carts of a drive system.

Referring now to FIG. 18A, FIG. 18B, and FIG. 18C, in various embodiments, robotic arm modules 300 and tool modules 400 may detachably couple to carts 530 of drive system 500. In this manner, carts 530 operatively connect transmissions 320, 420 of modules 300, 400 to motors 510 for powering operation of modules 300, 400, as well as provide means for translating modules 300, 400 to advance/withdraw the associated robotic arm 310 or elongated tool 410.

To better illustrate this connection, FIG. 18B depicts top (b) and FIG. 18C depicts bottom (c) schematic views of a representative tool cart 530 of drive system 500. Tool module 400 may detachably couple to a top side of tool cart 530 and one or more motors 510 may be coupled to a bottom side of tool cart 530. Tool cart 530, in various embodiments, may include one or more mechanical couplers 532, such as Hirsch couplers, for operatively connecting tool module 400 to motors 510. In particular, mechanical couplers 532 provide a mechanical interface for transmitting power from an output 512 of motors 510 to an input 422 of transmission 420 and thereby controlling rotation of elongate tool 410 and operation of tool member 416, as previously described. Tool cart 530 may additionally or alternatively be provided with electrical couplers for transmitting electrical power and/or signals to tool module 400, such as in electrocautery tool embodiments.

Figure 19:
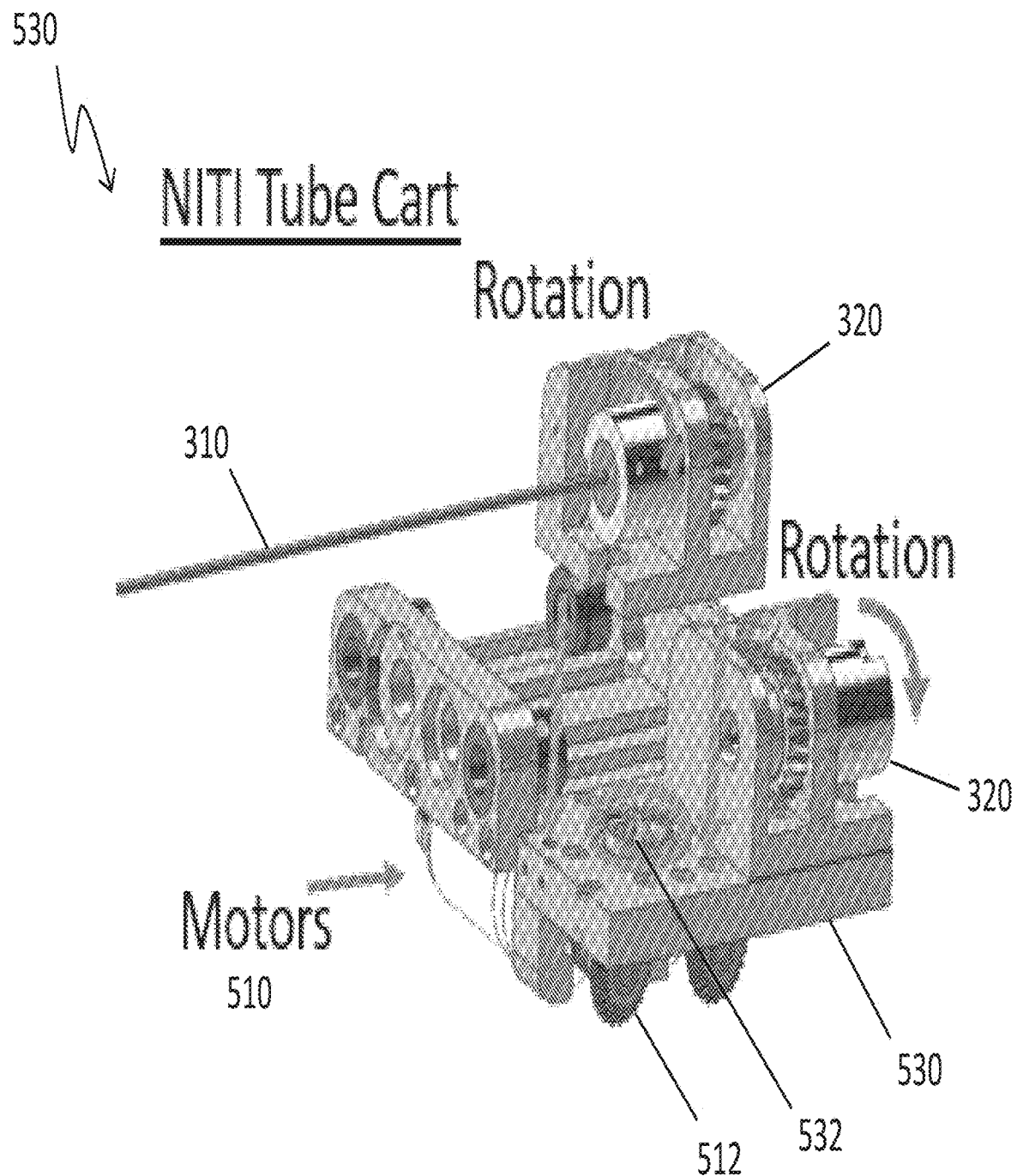
FIG. 19 depicts a perspective view of the arm carts.

FIG. 19 depicts a perspective view of arm carts 530, respectively. In FIG. 19, two robotic arm modules 300, each containing a tube for forming a concentric tube robotic arm 310, are attached in line with one another on the top surface of arm cart 530 as illustrated by the red arrows. Locating holes (later described) help to properly align each robotic arm module 300 such that the input of its respective transmission 320 mates with the top portion of the Hirsch coupler 532 on the top surface of arm cart 530. Outputs 512 of motors 510 mate with the bottom portion of Hirsch couplers 532. As configured, actuation of motors 510 causes rotation of the Hirsch couplers, which in turn causes rotation of transmissions 320 and thus rotation of the tubes of robotic arm 310 as shown by the blue arrows.

Figure 20A:
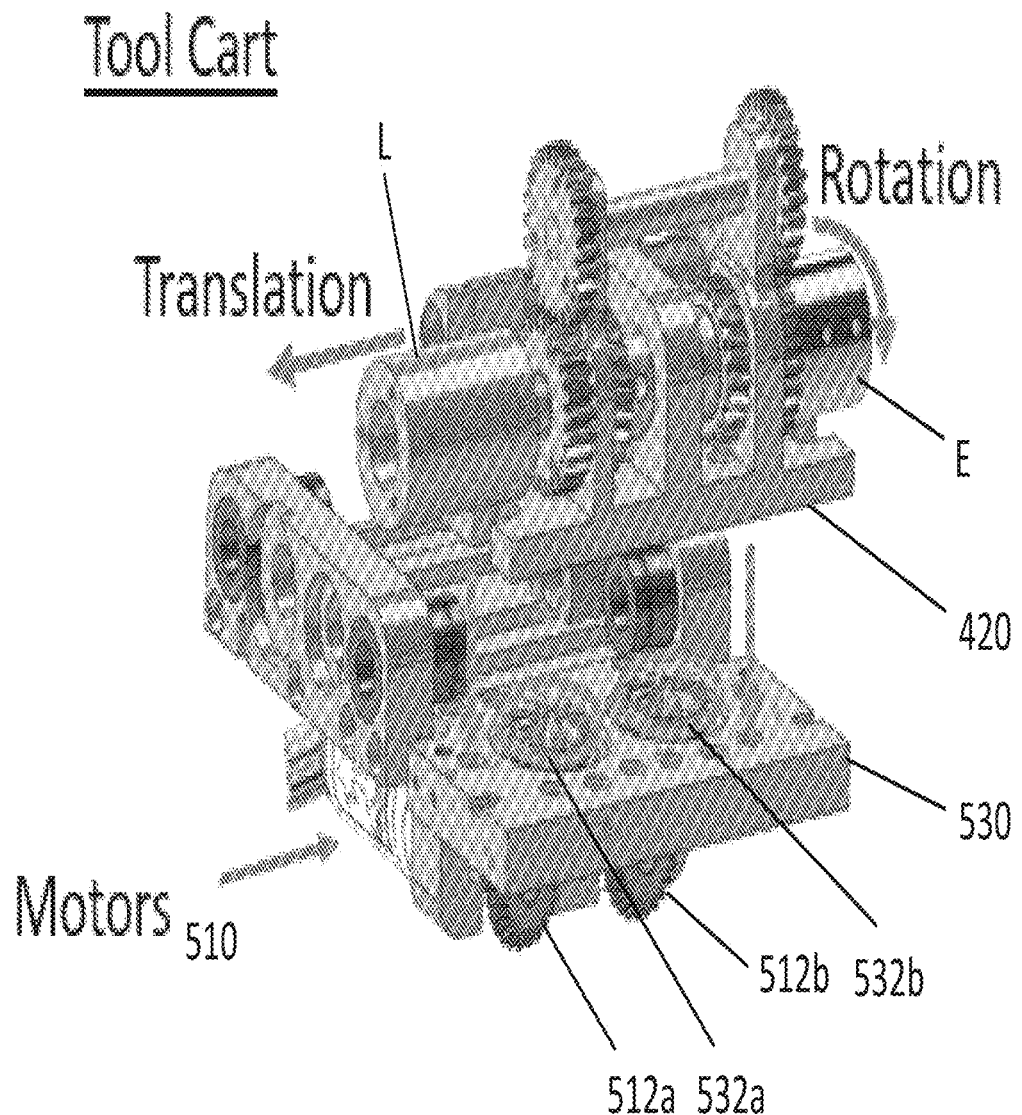
FIG. 20A and FIG. 20B depict perspective views of right-arm and left-arm tool carts.
Figure 20B:
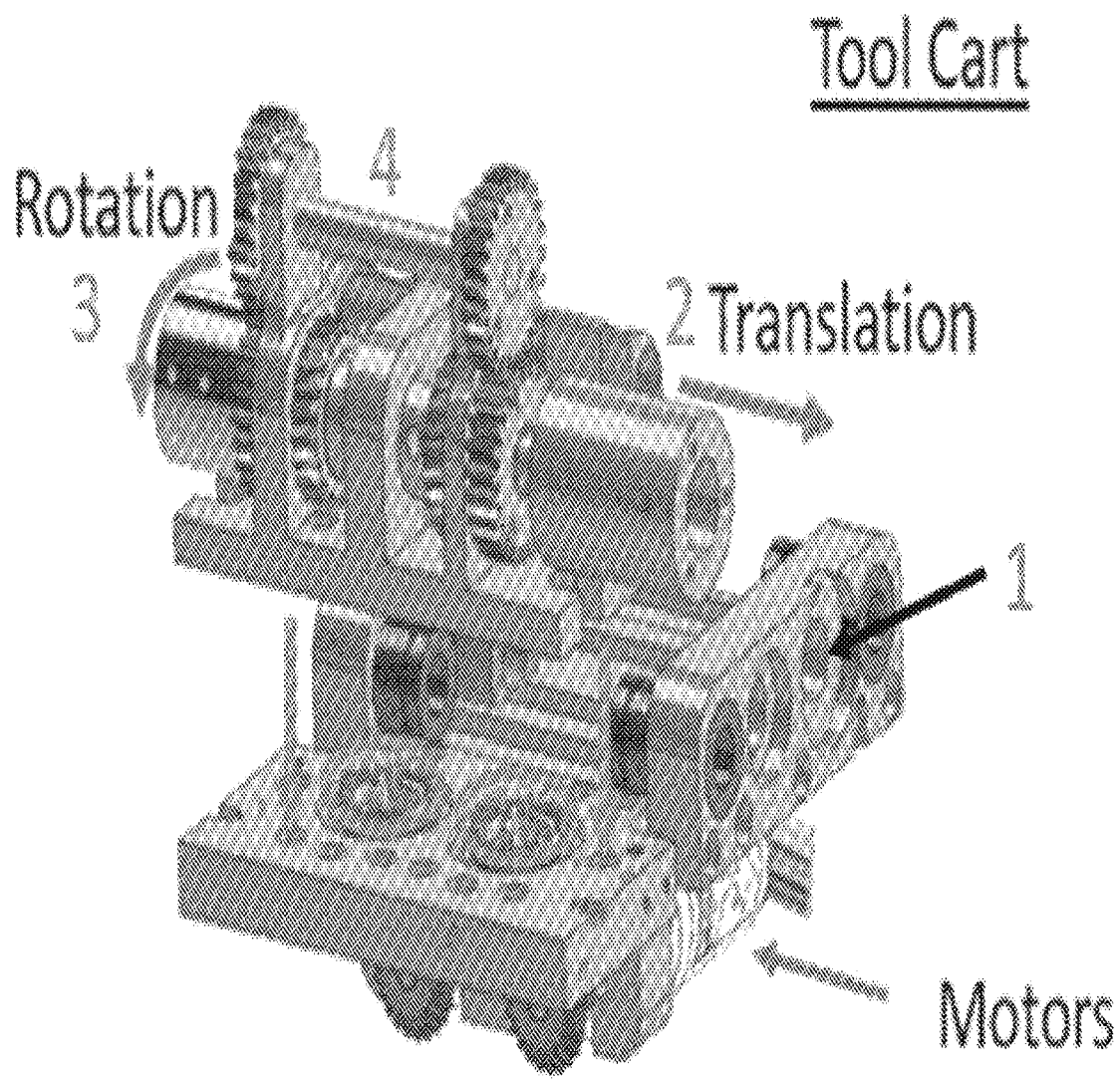

FIG. 20A and FIG. 20B depict perspective views of right-arm and left-arm tool carts 530. Referring first to FIG. 20A, tool module 400 is attached to the top surface of tool cart 530 as illustrated by the red arrows. Locating holes (later described) help to properly align the tool module 400 such that the two inputs of its transmission 420 mate with the top portions of the two Hirsch couplers 532 on the top surface of tool cart 530. Outputs 512 of motors 510 mate with the bottom portion of Hirsch couplers 532. As configured, actuation of motors 510 causes rotation of Hirsch couplers 532a, 532b, which in turn causes translation of coupler (L) for operating tool member 416 and rotation of coupler (E) for rotating elongate tool 410, respectively. All of these tools 410 can rotate or roll about their axis, adding a fourth degree of freedom—that is, tool modules 400 may provide degrees of freedom to (1) extend and retract the tool 410 in synchrony with the corresponding robotic arm 310 along rail system 520 (later described), (2) actuate the push/pull wire 418 to open and close the tool 410, (3) rotate the tool 410 about its axis, and (4) rotate the push/pull wire 418 in synchrony with the tool 410 so that it does not become twisted. These degrees of freedom are labeled in FIG. 20B.

Figure 21C:
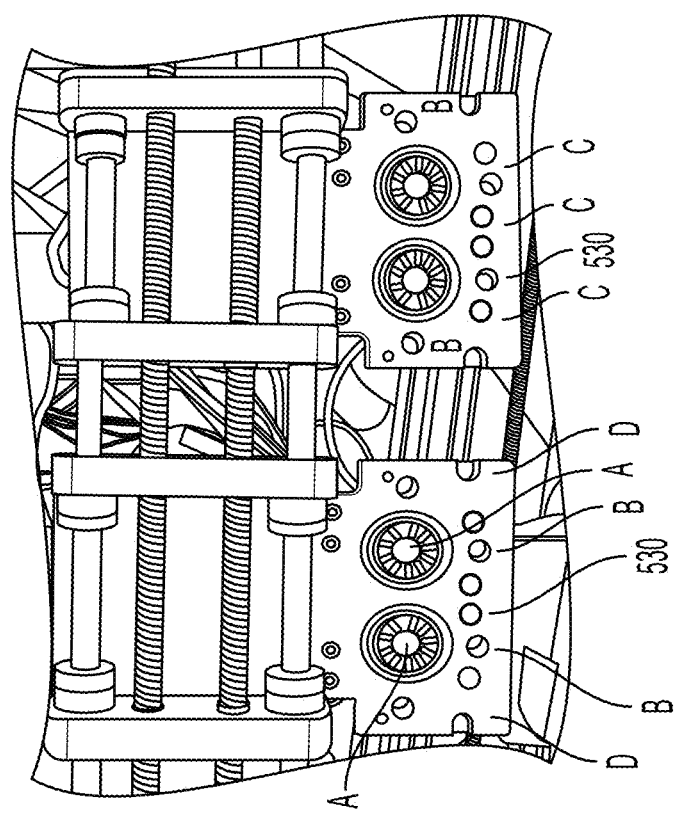
FIG. 21A, FIG. 21B, and FIG. 21C show representative mechanical and magnetic coupling interfaces on prototype embodiments of the modules and tool carts.
Figure 21A:
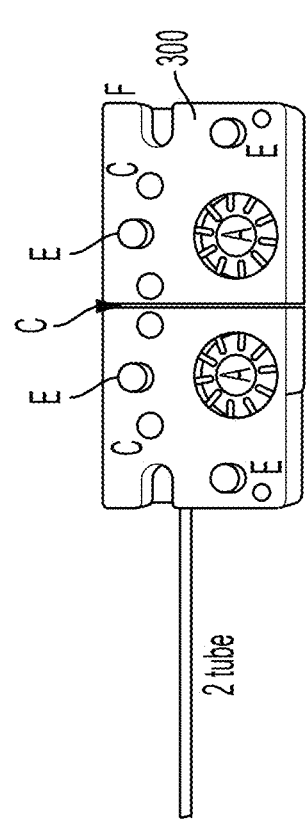
Figure 21B:
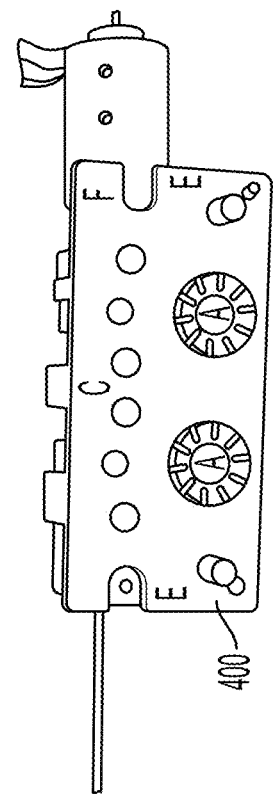

FIG. 21A, FIG. 21B, and FIG. 21C show representative mechanical and magnetic coupling interfaces on prototype embodiments of modules 300, 400 and tool carts 530. Hirth couplers (A) mate the motors 510 on the underside of carts 530 (not shown) to the transmission inputs of robotic arm module 300 and tool module 400. Locating pins (E) mate with locating holes (B) and ensure proper alignment of these couplers when modules 300, 400 are attached to their respective carts 530. Magnets (C) fix the modules 300, 400 into place on tool carts 530 while allowing a user to decouple the modules 300, 400 from tool carts 530 easily with their hands. Magnets (C) communicate through slot (F) with Hall Effect sensors (D). Note that many alternative coupling methods are possible. While not shown, electrical or optical coupling interfaces (e.g., components that provide an electrical or optical connection between modules 300, 400 and tool carts 530) may also be included in some embodiments.

Translational Movement

Figure 22:
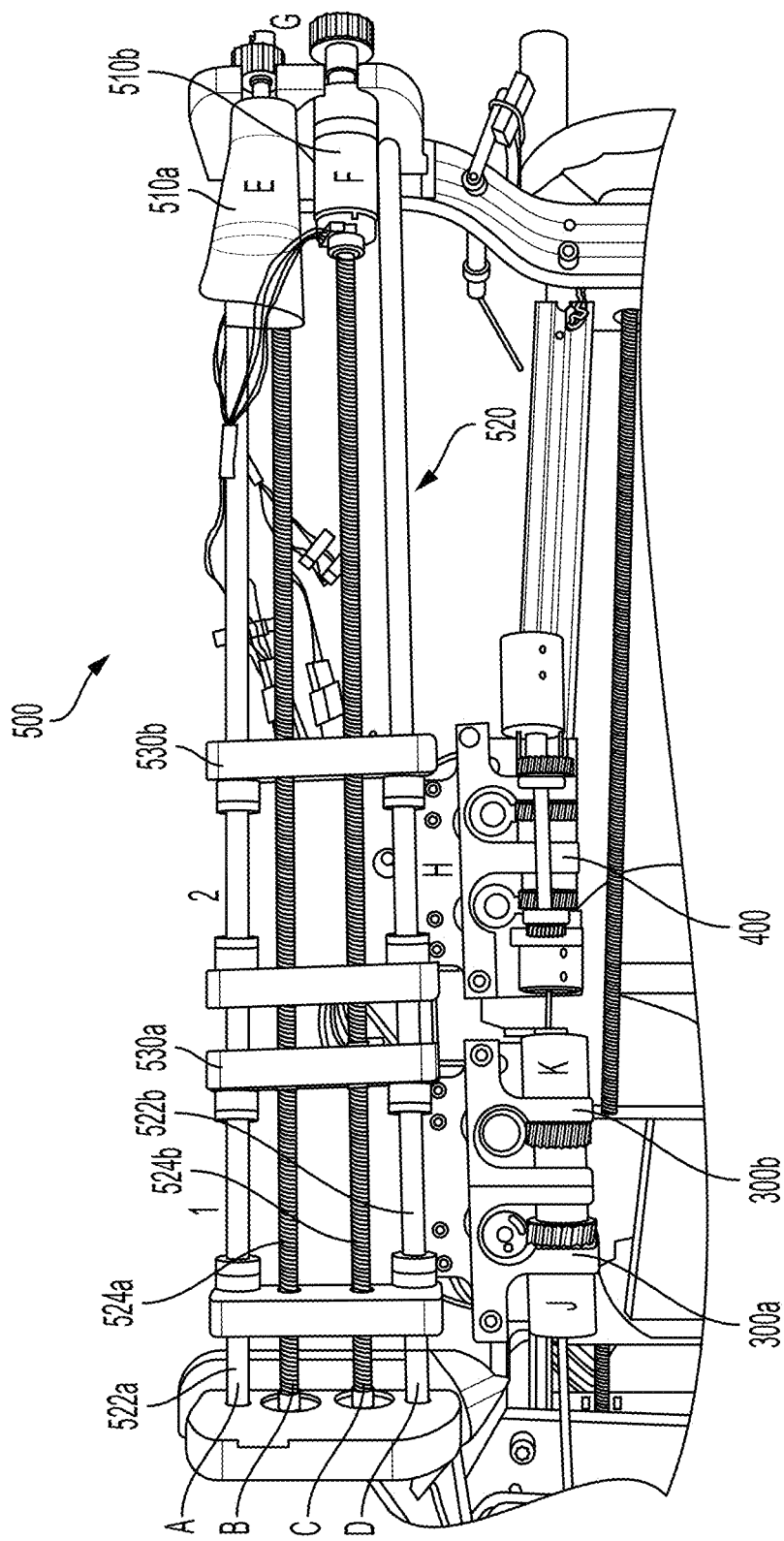
FIG. 22 depicts a top view representative rail system with one or more rails or tracks, one or more motors, and a transmission.

FIG. 22 depicts a top view of a representative rail system 520 of the present disclosure. Rail system 520, in various embodiments, may generally include one or more rails or tracks 522, as well as one or more motors 510 and a transmission 524 for powering movement of carts 530 along rails 522. As configured, rail system 520 may provide for translational movement of robotic arm modules 300 and tool modules 400 via carts 530, thereby enabling robotic device 100 to advance/withdraw robotic arm 310 and elongate tool 410. Additionally or alternatively, in some embodiments, such as those including concentric tube robotic arms 310, independent translational movement of robotic arm modules 300 can be used to extend/retract portions of robotic arm 310 in a telescoping manner.

In the embodiment of FIG. 22, arm cart 530a carries two robotic arm modules 300a, 300b (which form a two-tube concentric tube robotic arm 310) and tool cart 530b carries a tool module 400. It should be noted that, in various embodiments, the components of robotic arm modules 300a, 300b can be combined to form a single robotic arm module 300 comprising a two tube concentric tube robotic arm, with each tube having its own respective transmission 320 components for rotation. Carts 530a, 530b ride on rails 522a, 522b and are driven by lead screws 524a, 524b, respectively. Actuation of motor 510a rotates lead screw 524a through gear stage (G), which in turn moves arm cart 530a backwards/forwards on rails 522a, 522b depending on the direction of rotation of lead screw 524a. Similarly, actuation of motor 510b rotates lead screw 524b, which in turn moves tool cart 530b backwards/forwards on rails 522a, 522b depending on the direction of rotation of lead screw 524b. It should be recognized that, in other embodiments, motion of arm cart 530a and tool cart 530b can alternatively be coupled. In such an embodiment, drive motor 510b and drive screw 524b are unnecessary, and both carts 530a, 530b may instead be coupled to drive screw 524a to synchronize their motions.

Since robotic arm modules 300a, 300b are connected to a single arm cart 530 in this particular embodiment, translational movement of their respective tubes are coupled, and thus robotic arm 310 is fixed length (rather than telescoping) and translation of arm cart 530a advances/withdraws robotic arm 310. Of course, in other embodiments (not shown), translational movement of robotic arm modules 300a, 300b may be decoupled by providing an additional arm cart 530c for carrying robotic arm module 300b. In such an embodiment, rail system 520 may be configured with a third drive screw 524c and motor 524c for driving arm cart 530c independent of arm cart 530a. This concept is illustrated in the context of the three-tube embodiment shown in FIG. 23.

Figure 23:
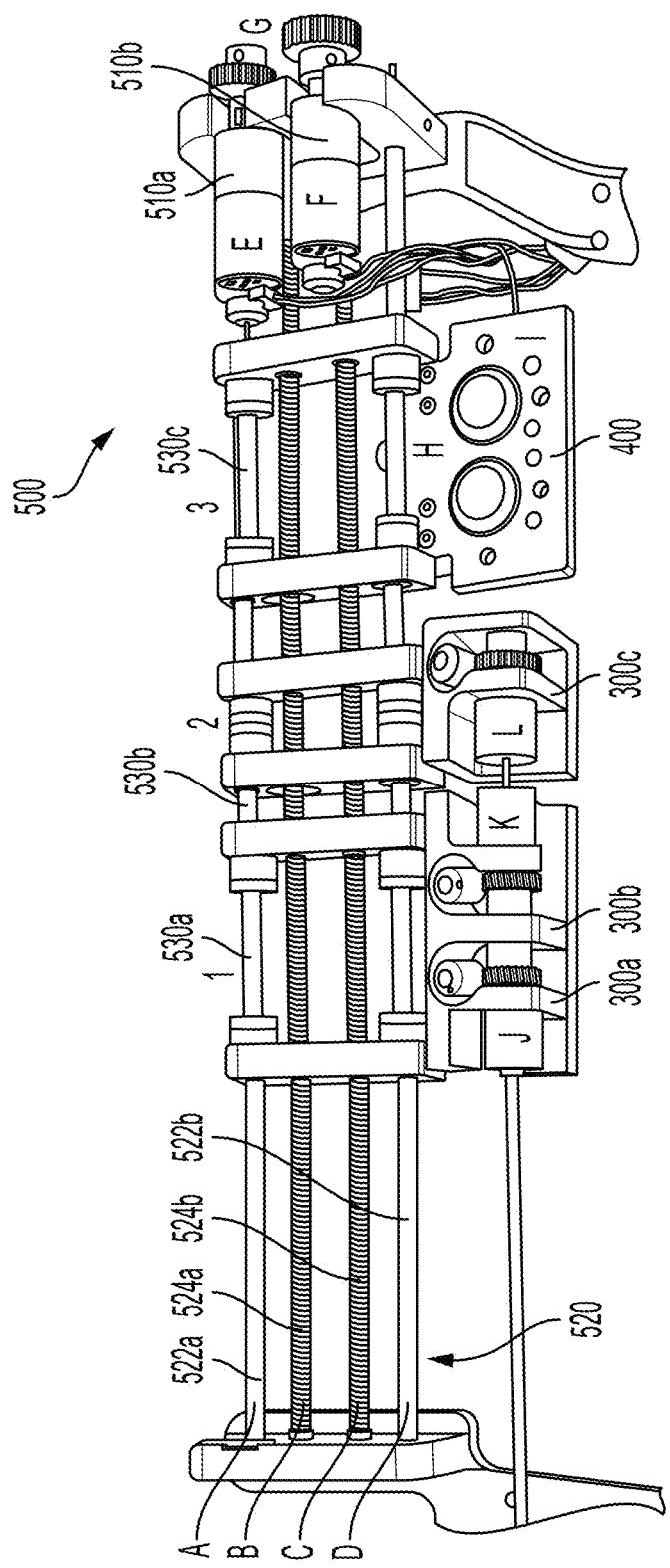
FIG. 23 depicts a top view of a representative rail system used for a three-tube robot.

FIG. 23 depicts a top view of a representative rail system 520 used for a three-tube robot. In this embodiment, a first arm cart 530*a* carries robotic arm modules 300*a*, 300*b*, a second arm cart 530*b* carries robotic arm module 300*c*, and a tool cart 530*c* carries tool module 400 (not shown as tool module 400 has been removed from tool cart 530*c* in the present view). Similar to the embodiment of FIG. 22, carts 530*a*, 530*b*, 530*c* ride on rails 522*a*, 522*b*; however, here cart 530*a* is driven by lead screw 524*a* and carts 530*b*, 530*c* are driven by lead screw 524*b*. Actuation of motor 510*a* rotates lead screw 524*a* through gear stage (G), which in turn moves arm cart 530*a* backwards/forwards on rails 522*a*, 522*b* depending on the direction of rotation of lead screw 524*a*. Actuation of motor 510*b* rotates lead screw 524*b*, which in turn moves arm cart 530*b* and tool cart 530*c* backwards/forwards in unison on rails 522*a*, 522*b* depending on the direction of rotation of lead screw 524*b*.

As configured, independent movement of robotic arm module 300*c* from robotic arm modules 300*a*, 300*b* allows the tube provided by robotic arm module 300*c* (e.g., distal tube 316) to telescope in and out relative to the portion of arm 310 defined by the tubes of robotic arm modules 300*a*, 300*b* (e.g., proximal tube 312, intermediate tube 314, respectively). Further, elongate tool 410 advances/withdraws with the tube provided by robotic arm module 300*c* (e.g. distal tube 316), thereby ensuring that tool member 416 (not shown) extends from the distal end of robotic arm 310 by a predetermined amount regardless of whether telescoping robotic arm 310 is extended or retracted.

In various other embodiments (not shown), movement of robotic arm modules 300*a*, 300*b* along rail system 520 could be decoupled by providing an additional arm cart 530*d* between arm cart 530*a* and arm cart 530*b* to separately carry robotic arm module 300*b*. In such an embodiment, rail system 520 may be configured with a third drive screw 524*c* and motor 524*c* for driving arm cart 530*d* independent of arm cart 530*a*. Independent movement of robotic arm modules 300*a*, 300*b*, 300*c* may provide for the intermediate and distal tubes of the three-tube robotic arm 310 to independently telescope as opposed to just the distal tube in the embodiment shown. Likewise, in various other embodiments (not shown), movement of robotic arm module 300*c* and tool module 400 could be decoupled by providing an additional lead screw and motor to drive tool cart 530*c* independent of tool cart 530*b*. This may be appropriate for some tools for which it is useful to extend them by a varying length from the tip of robot arm 310. For example, it can be useful to extend biopsy forceps some distance beyond the end of a robot arm 310 to collect a tissue sample from outside the robot arm 310 workspace.

Modularity

Referring back to FIG. 1, FIG. 19, and FIG. 20A, in various embodiments, robotic arm modules 300 and tool modules 400 may be designed as modules that detachably couple (e.g., snap onto, clamp to, latch to, etc.) to carts 530 of drive system 500. This functionality serves several purposes. First, it allows robotic device 100 to be configured rapidly based on the procedure to be performed. Second, the modular design of robotic device 100 also allows for an arm 310 to be replaced if it malfunctions during a procedure. Third, once the endoscope 220 is inserted inside the body, the modular construction enables the swapping of tools 410 and/or replacement of robotic arms 310 without removing the endoscope 220 from the body. Over the course of both open and endoscopic surgical procedures, a surgeon will often use a variety of tools in each hand. Representative examples include grasping and dissection forceps, biopsy forceps, scissors, cautery tools, and lasers. In addition, the surgeon will use tools for supplying irrigation or aspiration at specific tissue locations. The modularity robotic device 100, in combination with its design where tool 410 may be inserted into and removed from working channel 311 of robotic arm 310, provides the ability to change the tools 410 at the tips of the robot arms 310 during a procedure without removing the robot arm 310. This approach is faster, simpler and safer than designs that couple a tool member to the tip of the robotic arm. The surgeon can thus remain focused on the surgical site and in control of each arm 310 while an assistant swaps a tool module 400. Tool modules 400 are smaller and lighter with this approach and no time is lost registering and initializing new robotic arm modules 300 with the control system. Furthermore, the tool member 416 is immediately visualized as it extends from the robot arm 310 and its extension distance is fixed. In contrast, in other designs, a robotic arm must be blindly extended several millimeters beyond the endoscopic sheath before it enters the field of view of the camera, creating a risk of accidently contacting and damaging tissue.

The robot can be assembled sequentially from the proximal to the distal section by inserting the arm section into its proximal neighbor until its module can be aligned with its corresponding adapter plate and then fastened into place.

As an alternative to our current design in which robot arms 310 and tools 410 are separate components controlled by separate modules, it would also be possible to design integrated modules containing both a robot arm 310 and a tool 410. These could be based on any robot architecture, for example, on tendon or multi-backbone actuation and the associated module would control both arm shape and tool motion.

Separation of Sterile/Nonsterile Components

Referring back again to FIG. 1, the design of robotic device 100 as described herein may advantageously minimize the number and complexity of those components required to be in a sterile environment of the operating room.

More specifically, robot arm components as well as the tools typically must be kept sterile and are thus stored in sterile packaging until the time of the procedure when they are mounted on robotic device 100. The remainder of the robotic device 100 need not be sterile, and thus can be separated from the sterile field by a barrier such as a sterile bag. The modular design of robotic device 100 thereby completely separates out the components of drive system 500 from the sterile environment, and thus only robotic arms 310, tools 410, and their associated transmissions 320, 420, respectively, must be kept sterile.

For this reason, drive system 500 detailed here places all of the large-stroke linear transmission components on the non-sterile side of the barrier. Small-stroke axial motions, such as pull wires 418 for actuating forceps can be incorporated into tool module 400 as previously described. This design strategy divides the robot arms into separate smaller modules corresponding to each telescoping section of an arm. There are additional advantages to dividing the arms into telescoping sections. For example, if one section breaks, it is only necessary to replace the broken section. An additional advantage of arm modularity is that a large number of arm designs can be assembled, e.g., tailored to a specific procedure or patient, from smaller numbers of telescoping sections.

Further, it is desirable to design the robotic arm modules 300 so as to minimize their size, weight and cost. By minimizing size and weight, they will be (1) easier to sterilize and (2) easier to handle in the operating room. It is also desirable to minimize robotic arm module 300 cost since they will need to be replaced after a small fixed number of procedures. The largest and heaviest components of robotic device 100 are those of the drive system 500 which produce translational movement of robotic arms 310 and tools 410. Because drive system components are often fabricated from metals for strength and are lubricated, it is an advantage to avoid having to sterilize them as well.

The sterile components of robotic device 100, such as endoscope 220, robot arm modules 300 and tool modules 400, in various embodiments, may be designed to lock onto the drive system 500 through adapter plates, shown in orange in FIG. 1. Drive system 500 may be draped in a sterile bag that incorporates the adapter plates. This allows endoscope 220, robotic arm modules 300, and tool modules 400 to be swapped inside the sterile field. Motors 510 for producing translational and rotational motions can be integrated in the non-sterile drive system 500. Sensors (e.g., motor encoders) and other electronics that are expensive and/or sensitive to sterilization can also be placed in the drive system 500 with electrical connections, if necessary, connecting through adapter plates to arm and tool modules 300, 400. Sensors, e.g., magnet-based Hall effect (HE) sensors, can also communicate through the sterile barrier. These sensors allow robotic device 100 to calibrate itself at any time during surgery while maintaining the sterile field. The robotic arm modules 300 and tool modules 400 can be sterilized by a variety of means such as steam or gas. As such, they could be used a limited number of uses, e.g., ten uses. They may also be designed as disposables.

Robotic Sheath 600

A significant challenge in resecting large lesions and transventricular lesions is the need to redirect the endoscope tip inside the ventricles so that robotic arms 310/tools 410 are directed toward and can reach the entire lesion. With a straight endoscope, this severely constrains the entry path into the ventricle, and viewpoint repositioning involves either levering against brain tissue or removing the scope and inserting through a second burr hole. Neither is a desirable option. Robotic device 100, in various embodiments, may be provided with a steerable robotic sheath system to address these challenges.

Figure 24:
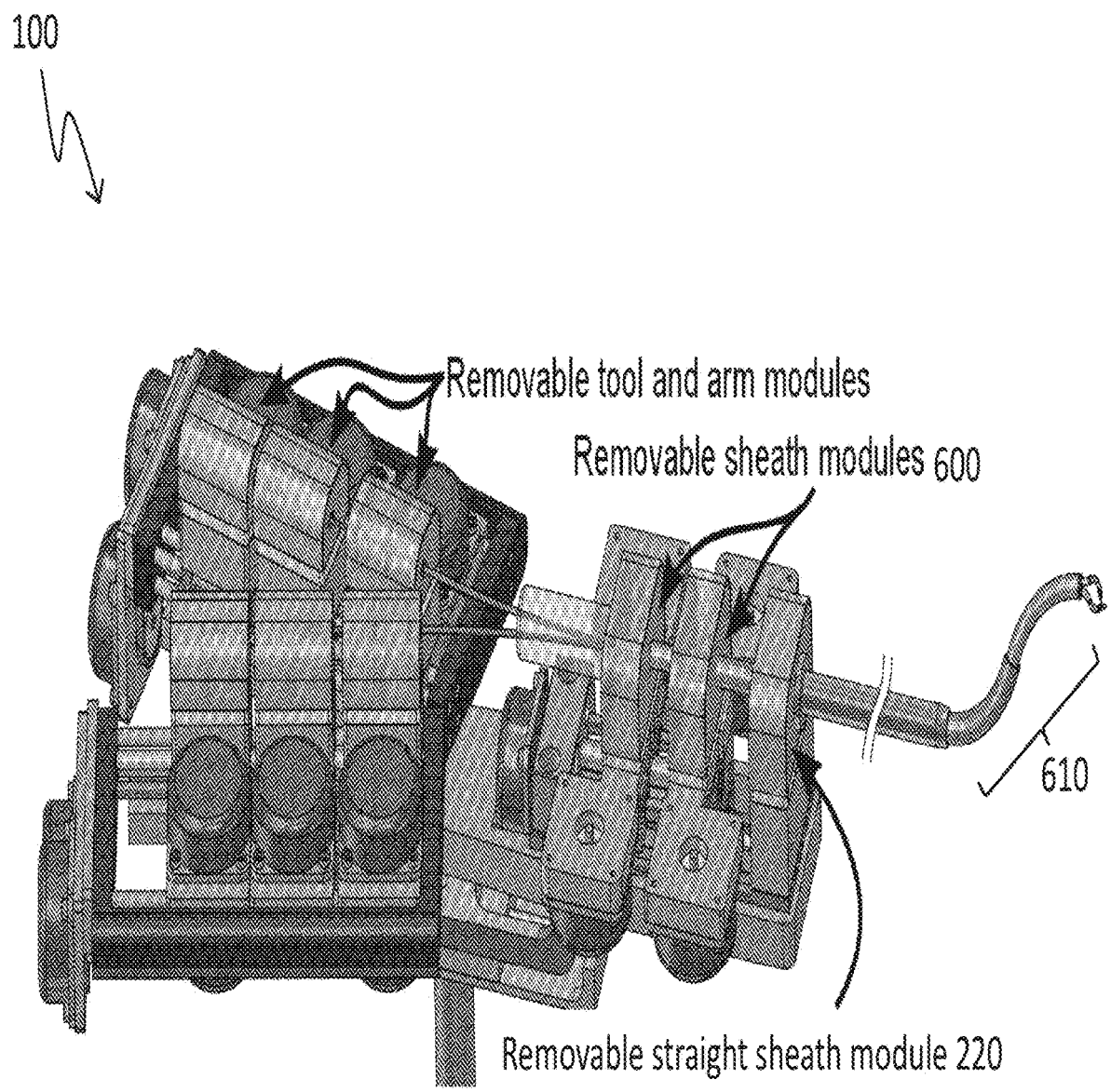
FIG. 24 depicts an embodiment of the robotic device configured to include a modular robotic sheath system.

FIG. 24 depicts an embodiment of robotic device 100 configured to include a modular robotic sheath system. The modular robotic sheath system, in various embodiments, may include one or more robotic sheath modules 600 configured to be combined to create a steerable robotic sheath 610, much in the way robotic arm modules 300 combine to create steerable robotic arms 310. Robotic sheath 610 may be provided with a working channel 311 (not shown) for accommodating robotic arms 310 there within and may optionally be inserted into a proximal end of a sheath 220 for advancement to the surgical site (e.g., through burr holes and brain matter in neurosurgery). It should be recognized that sheath 220 may be omitted in other procedures. Optics may be provided at the distal end of steerable robotic sheath 610 or integrated with arms or tools 310, 410.

Figure 25:
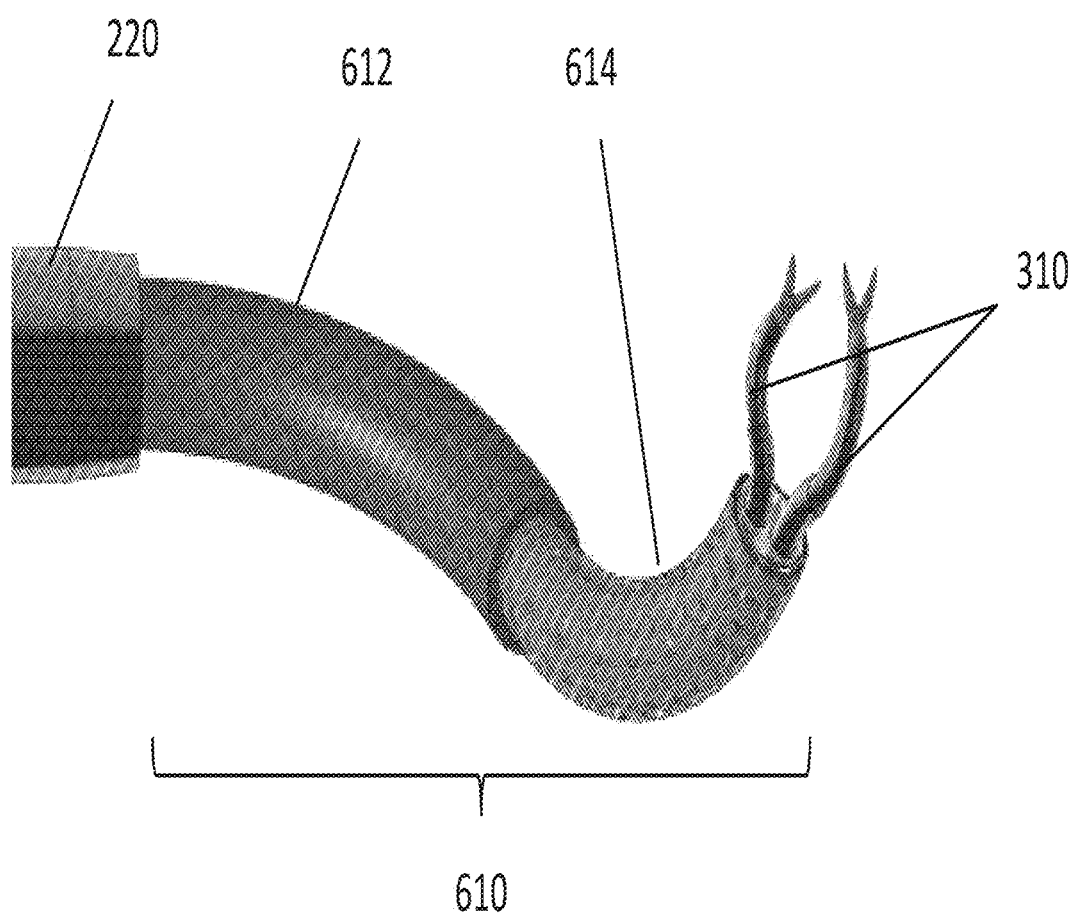
FIG. 25 illustrates the innermost steerable sheath containing one or more lumens.

Robotic sheath modules 600, in various embodiments, are analogous to robotic arm modules 300: they may be sterilizable, detachable, telescopically arranged, and ride on independent linear drive stages. As shown in FIG. 25, the innermost steerable sheath 614 may contain one or more lumens for passing one or more robotic arms 310, as well as additional lumens for imaging systems, irrigation, aspiration, and other surgical functions. The depicted design uses two steerable sheath modules 600, which combine to form robotic sheath 610 including sheath segments 612, 614.

Figure 26:
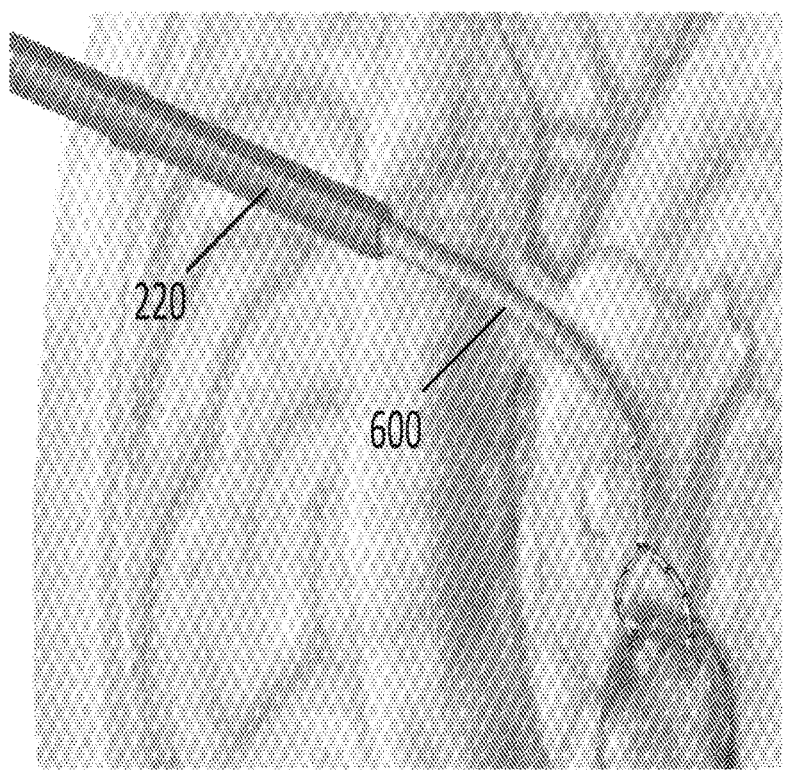
FIG. 26 illustrates a telescoping embodiment of the sheath.

While shown here as a two-segment sheath, it is understood that robotic sheath 610 may be formed of any number of segments suitable for steering a distal end of sheath 610 within the anatomy. Sheath segments 612, 614 may be controlled by a corresponding motors to produce bending in two independent planes as well as extension and retraction. The design enables independent or coordinated extension of each sheath segment 612, 614. A telescoping embodiment is shown in FIG. 26.

Figure 27:
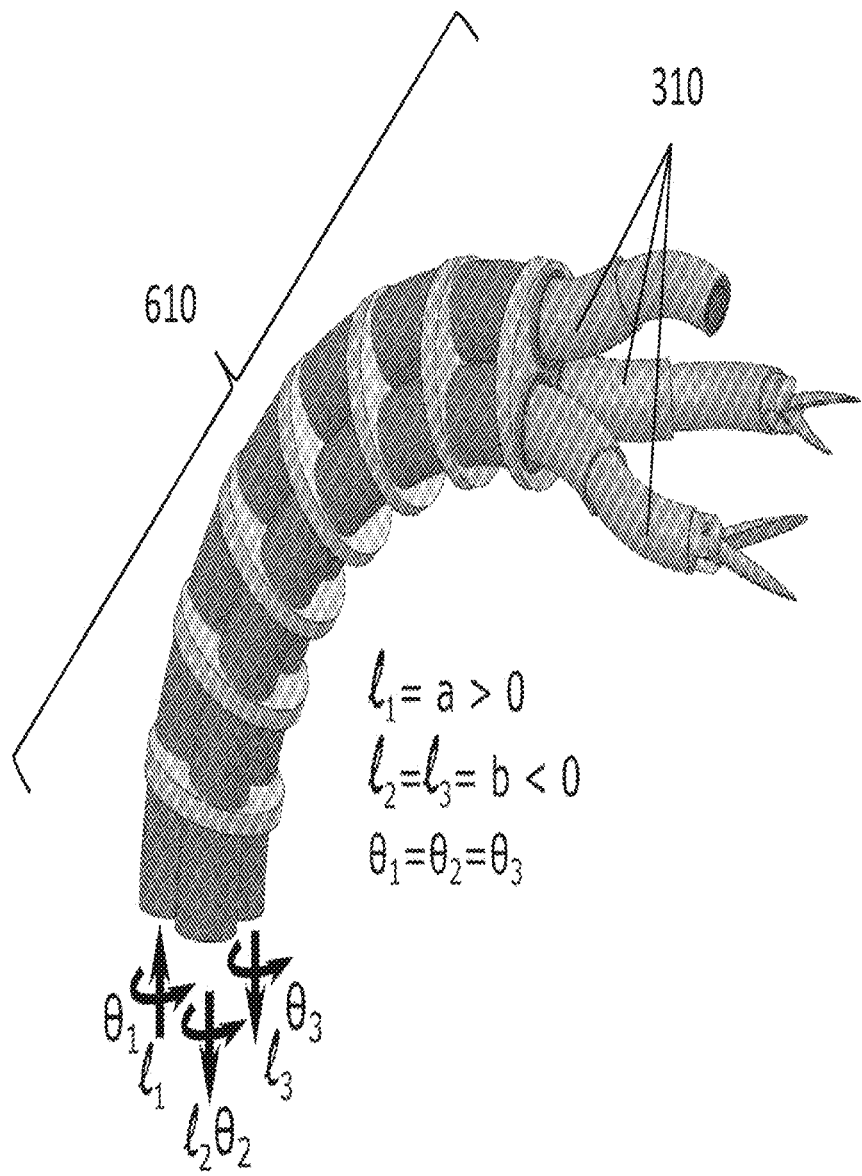
FIG. 27 depicts a multi-backbone design including three actuated designs, each of which are comprised of concentric tube robots.

Robotic sheath 610 can be constructed using any continuum robot architecture, such as those shown in FIG. 6 and described with respect to robotic arms 310. Robotic sheath 610 can also be constructed using a hybrid architecture that combines elements of the three designs. For example, FIG. 27 depicts a multi-backbone design including three actuated backbones, each of which are comprised of concentric tube robots and serve as the lumens through which pass two robotic arms and a robotic endoscope. In the simplest version, each backbone is comprised of a single pre-curved tube and the overall shape of robotic sheath 810 is controlled by rotating ($\theta_1$, $\theta_2$, $\theta_3$) and translating ($l_1$, $l_2$, $l_3$) these tubes.

Motors may be positioned to couple to a transmission 620 of each robotic sheath module 600 following the method used for robotic arm modules 300 and tool modules 400. An eccentric tube robot architecture employing the same number of tubes as robot arms is particularly easy to integrate. In this case, the tubes controlling sheath shape simply correspond to additional robot arm modules.

Control System and Operation

Figure 28A:
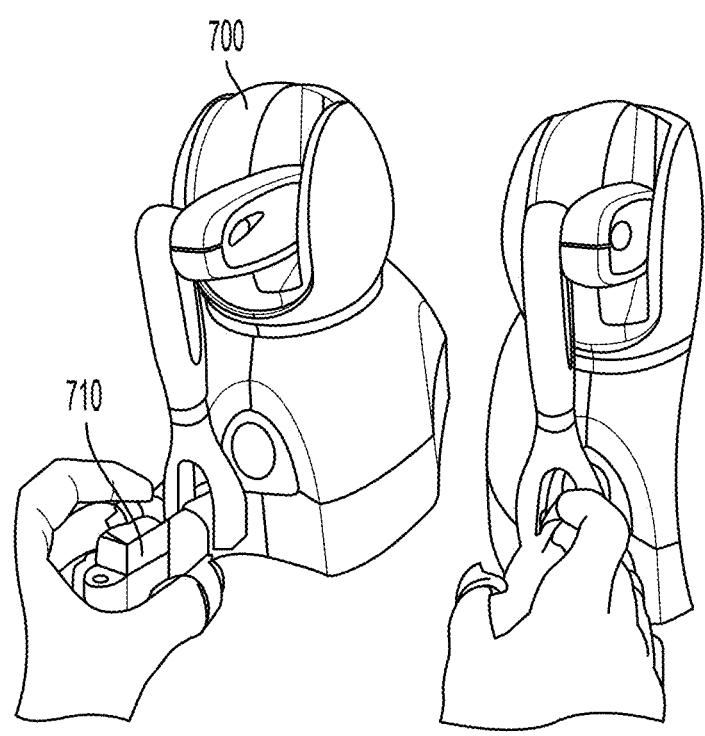
FIG. 28A depicts a representative interface for controlling the robotic device.

FIG. 28A depicts a representative interface for controlling robotic device 100. Each robotic arm 310, in various embodiments, may be controlled using a joystick 700, such as the commercially available six degree-of-freedom joysticks shown. Joystick motion moves the robotic arms through their workspace and enables the tools to roll about their axis. Each joystick may be modified to include additional controller 710 for operating tools 410. In an embodiment, tool controllers 710 may be custom finger grips operable to control tool open/close.

Figure 28B:
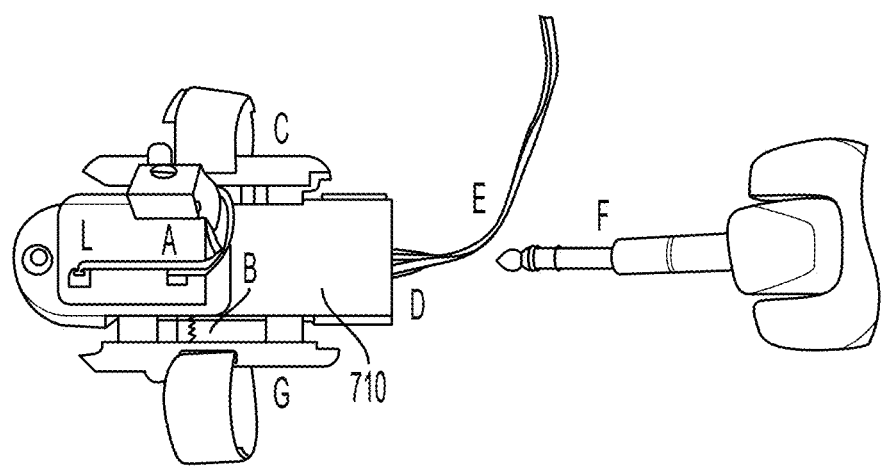
FIG. 28B depicts a representative embodiment of a tool controller.

FIG. 28B depicts a representative embodiment of a tool controller 710. Tool controllers 710, in various embodiments, may mimic the pinch grips which surgeons already typically use in the operating room with standard open surgery tools such as forceps. A clutch button (A) activates and deactivates robot control. Fingers fit in Velcro loops (C) to manipulate input paddles (G). When pinching, the two input paddles (G) are synchronized with a rack (B) and pinion mechanism so that each finger displaces an equal stroke length. This is critical for the reliability of a working surgical input device. Hall Effect sensors inside the device body sense the displacement of each input paddle (G). The signal from these sensors is carried to a DAC through wires (E). A female 0.25" audio jack connector (D) which accepts the Omni Phantom/3D touch audio jack connector (F) is used for attachment.

Figure 29:
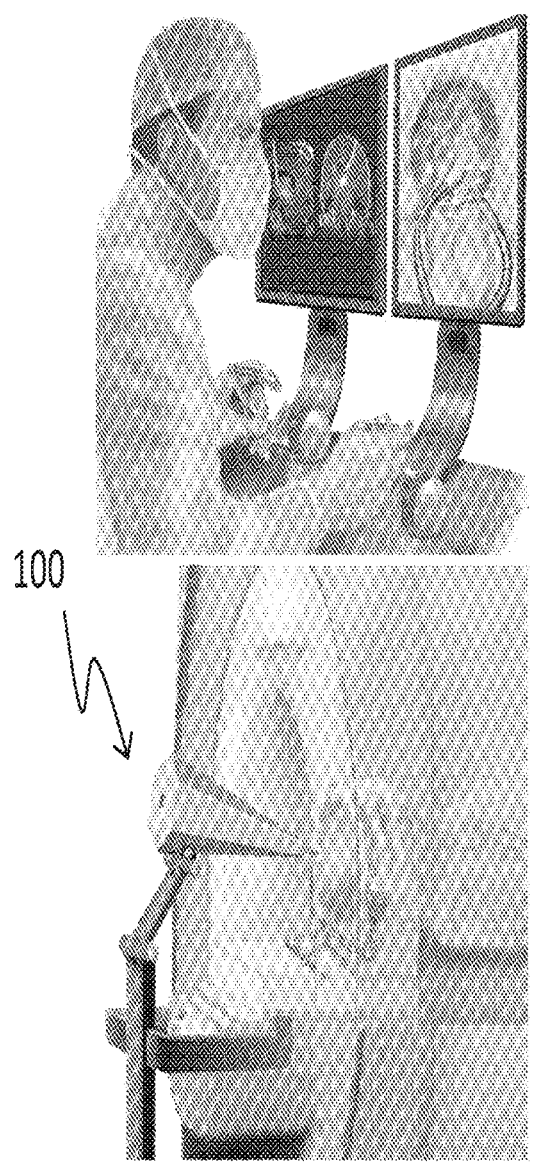
FIG. 29 depicts the robotic device being used by a surgeon to resect tissue robotically under endoscopic and MR guidance.

FIG. 29 depicts robotic device 100 being used by a surgeon to resect tissue robotically under endoscopic and MR guidance. During resection of periventricular tumors, the parenchyma collapses inward on the remaining lesion making it difficult to determine the extent of the residual lesion, or the location of hidden eloquent or critical structures. While MRI scanners are available in many neurosurgical suites and intraoperative MRI has been shown to be effective for monitoring the exact boundaries of residual lesion in open surgery, MR imaging is not currently performed during endoscopic cases due to the risks of removing and reinserting the non-MR-compatible endoscope. Even in open surgery, its use is limited since the operation must be suspended for the duration of scanning (typically an hour) and all instruments removed from the operative field before the patient is moved into the MRI bore. To avoid long procedure times and extended anesthesia, intraoperative MRI is typically performed once at the end of a procedure and so serves as an important verification tool rather than for real-time surgical guidance. If MR imaging could be made truly intraoperative, its full potential could be realized for: (1) eliminating dissection errors due brain shift in preoperative images arising from leakage of cerebrospinal fluid, (2) evaluation of tumor margins during dissection, and (3) detection of hidden delicate structures. While instruments and optical systems can be designed to be MR compatible, the primary challenge is the physical constraint of locating equipment and surgeon inside the scanner bore.

Robotic device 100, in various embodiments, can be converted to be MRI conditional by making the following changes: (1) The chassis and drive gears may be made of plastic, and linear rails and leadscrews could be made of brass equivalents. (2) DC motors would be replaced with MRI conditional piezoelectric motors and Hall effect sensors replaced with optical sensors. (3) Steel ball bearings would be replaced with plastic or ceramic sleeve bearings. (4) Electrical cable would be shielded to minimize MRI artifact induction. All these alternative parts are easily obtainable from standard suppliers.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A robotic device, comprising:
   a support structure;
   a robotic arm coupled to the support structure and having an internal working channel extending from a proximal end to a distal end of the robotic arm, wherein a shape of the robotic arm is robotically controlled to position and orient the distal end of the robotic arm about a surgical site;
   a drive system coupled to the support structure; and
   a tool module configured to detachably couple to the drive system, the tool module comprising:
      an elongate tool configured to be advanced through the internal working channel to the surgical site at the distal end of the robotic arm and subsequently removed from the robotic arm without having to withdraw the robotic arm from the surgical site during a surgical procedure, and
      a transmission configured to operatively connect the drive system and the elongate tool when the tool module is coupled with the drive system thereby providing for operation of the elongate tool by the drive system.

2. The robotic device of claim 1, wherein the robotic arm is one of a concentric tube robotic arm, a tendon-driven robotic arm, or a multi-backbone robotic arm.

3. The robotic device of claim 1, wherein the elongate tool includes an elongate member, a tool member, and a transmission element.

4. The robotic device of claim 1, wherein the transmission is operable to rotate and operate the elongate tool.

5. The robotic device of claim 1, wherein the drive system includes one or more motors configured to deliver power to the transmission of the tool module.

6. The robotic device of claim 1, wherein the drive system further includes a rail system along which the tool module translates to advance and withdraw the elongate tool at the surgical site.

7. The robotic device of claim 1, comprising two or more robotic arms and a corresponding number of tool modules.

8. The robotic device of claim 7, wherein the support structure includes two or more bearings for guiding the two or more robotic arms into substantially parallel alignment for advancement to a surgical site.

9. The robotic device of claim 1, wherein the robotic arm is provided as part of a detachable robotic arm module including a transmission configured to be coupled to the drive system for rotating at least a portion of the robotic arm.

10. The robotic device of claim 9, wherein the drive system is operable to provide coupled or independent translation of the robotic arm module and the tool module.

11. A robotic device, comprising:
    a first robotic arm module comprising a first tube and a first transmission configured to rotate the first tube;
    a second robotic arm module comprising a second tube and a second transmission configured to rotate the second tube, the second tube configured to be inserted into the first tube to form a concentric tube arm and subsequently removed from the first robotic arm without having to withdraw the first robotic arm from a surgical site during a surgical procedure; and
    a drive system configured for rotating the first tube and the second tube via the first transmission and the second transmission, respectively, and for translating the first arm module and the second arm module to advance and withdraw the first tube and the second tube.

12. The robotic device of claim 11, further comprising one or more sterile barriers separating the first and second robotic arm modules from the drive system, respectively.

13. The robotic device of claim 11, wherein the drive system is configured to rotate the first tube independent of the second tube.

14. The robotic device of claim 11,
    wherein the drive system is configured to translate the first arm module independent of the second arm module, and
    wherein the concentric tube arm is configured to extend and retract in a telescoping manner.

15. The robotic device of claim 11, wherein the concentric tube arm includes a working channel.

16. The robotic device of claim 15, further including a tool module having an elongate tool dimensioned to be advanced and withdrawn through the working channel of the robotic arm.

17. The robotic device of claim 16, wherein the tool module includes a transmission configured to detachably couple to the drive system for rotating and/or operating the tool.

18. The robotic device of claim 17, wherein the drive system is configured to translate the tool module and second arm module in unison.

19. The robotic device of claim 17, wherein the drive system is configured to translate the tool module and the second arm module independently.

20. The robotic device of claim 11, wherein the drive system includes at least one motor, at least one cart, and a rail system.

21. A robotic device, comprising:
a robotic arm module comprising a concentric tube arm and a transmission configured to rotate at least one tube of the concentric tube arm, wherein the concentric tube arm includes an internal working channel;
a drive system configured for rotating the at least one tube via the transmission and for translating the robotic arm module to advance and withdraw the concentric tube arm;
one or more sterile barriers separating the robotic arm module from the drive system; and
a tool module having an elongate tool configured to be advanced and withdrawn through the working channel of the concentric tube arm, without having to withdraw the robotic arm from a surgical site during a surgical procedure.

22. The robotic device of claim 21, wherein the drive system is configured to rotate a first tube of the concentric tube arm independent of a second tube of the concentric tube arm.

23. The robotic device of claim 21, wherein the drive system is configured to translate the tool module and arm module in unison.

24. The robotic device of claim 21, wherein the drive system is configured to translate the tool module and the arm module independently.

25. The robotic device of claim 21, wherein the drive system includes at least one motor, at least one cart, and a rail system.

* * * * *